United States Patent
Ushiki et al.

(10) Patent No.: US 10,817,882 B2
(45) Date of Patent: Oct. 27, 2020

(54) CUSTOMER SERVICE MANAGING METHOD, INFORMATION PROCESSING DEVICE, AND STORAGE MEDIUM

(71) Applicant: FUJITSU LIMITED, Kawasaki-shi, Kanagawa (JP)

(72) Inventors: Kazumasa Ushiki, Kawasaki (JP); Naoki Nishiguchi, Kawasaki (JP); Akira Fujii, Machida (JP); Tatsuro Matsumoto, Yokohama (JP); Riichiro Take, Setagaya (JP)

(73) Assignee: FUJITSU LIMITED, Kawasaki (JP)

(*) Notice: Subject to any disclaimer, the term of this patent is extended or adjusted under 35 U.S.C. 154(b) by 1122 days.

(21) Appl. No.: 15/178,032

(22) Filed: Jun. 9, 2016

(65) Prior Publication Data
US 2016/0364731 A1 Dec. 15, 2016

(30) Foreign Application Priority Data
Jun. 11, 2015 (JP) ................... 2015-118610

(51) Int. Cl.
*G06Q 30/00* (2012.01)
*G06Q 10/06* (2012.01)
(Continued)

(52) U.S. Cl.
CPC ..... *G06Q 30/016* (2013.01); *G06Q 10/063112* (2013.01); *H04L 67/16* (2013.01); *G06Q 10/063114* (2013.01); *G06Q 30/0281* (2013.01)

(58) Field of Classification Search
CPC ..... G06Q 10/063112; G06Q 10/063114; G06Q 30/016; G06Q 30/0281; H04L 67/16
(Continued)

(56) References Cited

U.S. PATENT DOCUMENTS 6,973,437 B1 * 12/2005 Olewicz ............... G06Q 30/02
705/15
7,385,479 B1 * 6/2008 Green .................. G06Q 10/00
340/286.02
(Continued)

FOREIGN PATENT DOCUMENTS

| JP | 2002-109195 | 4/2002 |
|---|---|---|
| JP | 2005-309908 | 11/2005 |

OTHER PUBLICATIONS

Frost & Sullivan: Digital Proximity Marketing: Short-Range Wireless Technologies Potential Says Frost & Sullivan. Anonymous. M2 Presswire [Coventry] Mar. 9, 2009.*
(Continued)

*Primary Examiner* — Timothy Padot
(74) *Attorney, Agent, or Firm* — Fujitsu Patent Center

(57) ABSTRACT

A customer service managing method includes identifying a clerk to perform customer service from among a plurality of clerks based on a customer service request and clerk terminal information indicating states of a plurality of clerks, the states being related to customer service, when receiving the customer service request from a second terminal device; transmitting identifying information identifying the customer service request to a first terminal device corresponding to the identified clerk and the second terminal device; updating the clerk terminal information so as to indicate that the identified clerk is performing customer service when receiving reception start information from the first terminal device; updating the clerk terminal information so as to indicate that the state of the identified clerk is in an available state when receiving reception stop information from the first terminal device; and transmitting an end message to stop the beacon to the second terminal device.

14 Claims, 23 Drawing Sheets

(51) Int. Cl.
*H04L 29/08* (2006.01)
*G06Q 30/02* (2012.01)

(58) Field of Classification Search
USPC .......................................................... 705/7.14
See application file for complete search history.

(56) References Cited

U.S. PATENT DOCUMENTS

| | | | | |
|---|---|---|---|---|
| 9,824,323 | B1* | 11/2017 | Weiss | G06Q 30/0282 |
| 2003/0088469 | A1* | 5/2003 | Leifer | G06F 1/1698 |
| | | | | 705/15 |
| 2004/0068441 | A1* | 4/2004 | Werbitt | G06Q 30/06 |
| | | | | 705/16 |
| 2007/0239474 | A1* | 10/2007 | Christie | G06Q 90/00 |
| | | | | 705/5 |
| 2010/0211489 | A1* | 8/2010 | Zhang | G06Q 30/04 |
| | | | | 705/34 |
| 2013/0263008 | A1* | 10/2013 | Bylahalli | G06Q 30/06 |
| | | | | 715/739 |

OTHER PUBLICATIONS

Retailers Look to CFM Technology to Elevate the In-Store Customer Experience; Qmatic "Customer Flow in Retail" survey reveals the growing adoption of kiosks and digital media to increase customer satisfaction, deliver added-value customer service and maximize shopper spend. M2 Presswire [Coventry] Feb. 28, 2012.*
Baesman; SmartPing partners with Baesman to offer a new location-based, geo-fencing mobile app to drive in-store retail traffic Marketing Weekly News [Atlanta] Dec. 8, 2012: 152.*

* cited by examiner

| APPOINTMENT ID | APPOINTED TIME | CLERK ID | CUSTOMER ID |
|---|---|---|---|
| 1 | 11:00 TO 12:00 | Staff-R | Customer-R1 |
| 2 | 13:00 TO 14:00 | Staff-R | Customer-R2 |

102

| CUSTOMER ID |
|---|
| Customer-V1 |
| Customer-V2 |

| CLERK ID | PRODUCT IN CHARGE | MANUFACTURER IN CHARGE | CUSTOMER SERVICE IN CHARGE | CUSTOMER SERVICE TIME |
|---|---|---|---|---|
| Staff-A | TV | COMPANY A | ORDINARY | 10 MINUTES |
| Staff-B | TV | COMPANY B | ORDINARY | 8 MINUTES |
| Staff-C | TV | * | ORDINARY | 9 MINUTES |
| Staff-R | TV | * | APPOINTMENT | 7 MINUTES |
| Staff-V | TV | * | VIP | 5 MINUTES |

104

| CLERK ID | PRESENT POSITION | TERMINAL ADDRESS | STATE |
|---|---|---|---|
| Staff-A | (Ax,Ay) | $A_1.A_2.A_3.A_4$ | PERFORMING CUSTOMER SERVICE |
| Staff-B | (Bx,By) | $B_1.B_2.B_3.B_4$ | PERFORMING CUSTOMER SERVICE |
| Staff-C | (Cx,Cy) | $C_1.C_2.C_3.C_4$ | AVAILABLE |
| Staff-R | (Rx,Ry) | $R_1.R_2.R_3.R_4$ | AVAILABLE |
| Staff-V | (Vx,Vy) | $V_1.V_2.V_3.V_4$ | AVAILABLE |

105

| CLERK ID | QUEUE DB |
|---|---|
| Staff-A | 3 |
| Staff-B |  |
| Staff-C |  |

FIG. 4

| APP ID | APP NAME | APP MAIN BODY |
|---|---|---|
| 1 | STANDBY APP | ...... |
| 2 | CALL BELL APP | ...... |

FIG. 5

| RECEPTION ID | CUSTOMER ID | STATE | PLACE | CLERK SELECTION INFORMATION | CALL TIME | CUSTOMER SERVICE START TIME | CUSTOMER SERVICE END TIME |
|---|---|---|---|---|---|---|---|
| 1 | Customer-M | BEING PROCESSED | DEPARTMENT M | BC1 | 13:03:30 | | |
| 2 | Customer-N | BEING PROCESSED | DEPARTMENT N | DEPARTMENT N | 13:05:00 | | |
| 3 | Customer-O | WAITING | DEPARTMENT O | Staff-A | 13:07:10 | | |

| CUSTOMER ID | TYPE | PRESENT POSITION | TERMINAL ADDRESS |
|---|---|---|---|
| Customer-M | ORDINARY | (Mx,My) | $M_1.M_2.M_3.M_4$ |
| Customer-N | ORDINARY | (Nx,Ny) | $N_1.N_2.N_3.N_4$ |
| Customer-O | ORDINARY | (Ox,Oy) | $O_1.O_2.O_3.O_4$ |
| Customer-R1 | APPOINTMENT | (Rx,Ry) | $R_1.R_2.R_3.R_4$ |
| Customer-V1 | VIP | (Vx,Vy) | $V_1.V_2.V_3.V_4$ |

FIG. 7

| BAR CODE | MODEL NUMBER | MANUFACTURER | CLASSIFICATION |
|---|---|---|---|
| BC1 | MN1 | COMPANY A | TV |
| BC2 | MN2 | COMPANY A | TV |
| BC3 | MN3 | COMPANY B | TV |
| BC4 | MN4 | COMPANY B | TV |

| AREA ID | AREA NAME | AREA DEFINITION |
|---|---|---|
| 1 | CASH REGISTER A | COORDINATES OF CENTER (x1,y1), RADIUS r1 |
| 2 | CASH REGISTER B | COORDINATES OF CENTER (x2,y2), RADIUS r2 |
| 3 | DEPARTMENT M | (x31,y31),(x32,y32) |
| 4 | DEPARTMENT N | (x41,y41),(x42,y42) |
| 5 | DEPARTMENT O | (x51,y51),(x52,y52) |
| 6 | WAREHOUSE | (x61,y61),(x62,y62) |

111

| AREA ID |
|---|
| 1 |
| 2 |
| 3 |

CUSTOMER SERVICE MANAGING METHOD, INFORMATION PROCESSING DEVICE, AND STORAGE MEDIUM

CROSS-REFERENCE TO RELATED APPLICATION

This application is based upon and claims the benefit of priority of the prior Japanese Patent Application No. 2015-118610, filed on Jun. 11, 2015, the entire contents of which are incorporated herein by reference.

FIELD

The embodiment discussed herein is related to a customer service managing method, an information processing device, and a storage medium.

BACKGROUND

A technology is known which calls a clerk for a customer seeking customer service in a store or the like (see for example Japanese Laid-open Patent Publication No. 2002-109195, Japanese Laid-open Patent Publication No. 2005-309908, or the like). Conventional known technologies include, for example, a technology in which a system calls all clerks, and a clerk responding first performs customer service, or a technology in which, in an establishment such as a restaurant or the like, a clerk who is moving is excluded as a clerk who is performing customer service, and a system calls a clerk near a table where a button pressed by a customer is installed.

In the above-described method in which the system calls all of the clerks, clerks are often called during customer service. This is annoying to the clerks. Solving this problem needs a mechanism for the system to correctly grasp whether or not customer service is being performed. A clerk may make a notification of whether the clerk is performing customer service by operating a button or the like. However, this method is undesirable because the operation is inconvenient and state management is not performed correctly when clerks forget to press the button. On the other hand, the method is conceivable in which a clerk who is moving is excluded as a clerk who is providing service, and the system calls a clerk near the table of the customer. However, this method can only be applied to cases where the position of the customer is fixed, and is not applicable to an environment in an ordinary store in which customers move. From the above, it is desirable to be able to manage the state of customer service appropriately.

SUMMARY

According to an aspect of the embodiment, a customer service managing method executed by a processor included in an information processing device that manages a first terminal device and a second terminal device, the customer service managing method includes identifying a clerk to perform customer service from among a plurality of clerks based on a customer service request and clerk terminal information indicating a state of each of the plurality of clerks, the state being related to customer service, when receiving the customer service request from the second terminal device; transmitting identifying information identifying the customer service request to the first terminal device corresponding to the identified clerk and the second terminal device; updating the clerk terminal information so as to indicate that the identified clerk is performing customer service when receiving, from the first terminal device, reception start information indicating that the first terminal device has received a beacon corresponding to the identifying information from the second terminal device; updating the clerk terminal information so as to indicate that the identified clerk is in an available state when receiving, from the first terminal device, reception stop information indicating that the reception of the beacon from the second terminal device is difficult; and transmitting an end message to stop the beacon to the second terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of data structures of an appointment managing database (DB) and a very important person (VIP) managing DB;

FIG. 3 is a diagram illustrating an example of data structures of a clerk DB, a clerk terminal DB, and a queue DB;

FIG. 4 is a diagram illustrating an example of a data structure of an app DB;

FIG. 5 is a diagram illustrating an example of a data structure of a message DB;

FIG. 6 is a diagram illustrating an example of a data structure of a visiting customer DB;

FIG. 7 is a diagram illustrating an example of a data structure of a product DB;

FIG. 8 is a diagram illustrating an example of data structures of an area DB and an allowed area DB;

DESCRIPTION OF EMBODIMENT

A preferred embodiment of the present technology will hereinafter be described.

Figure 1:
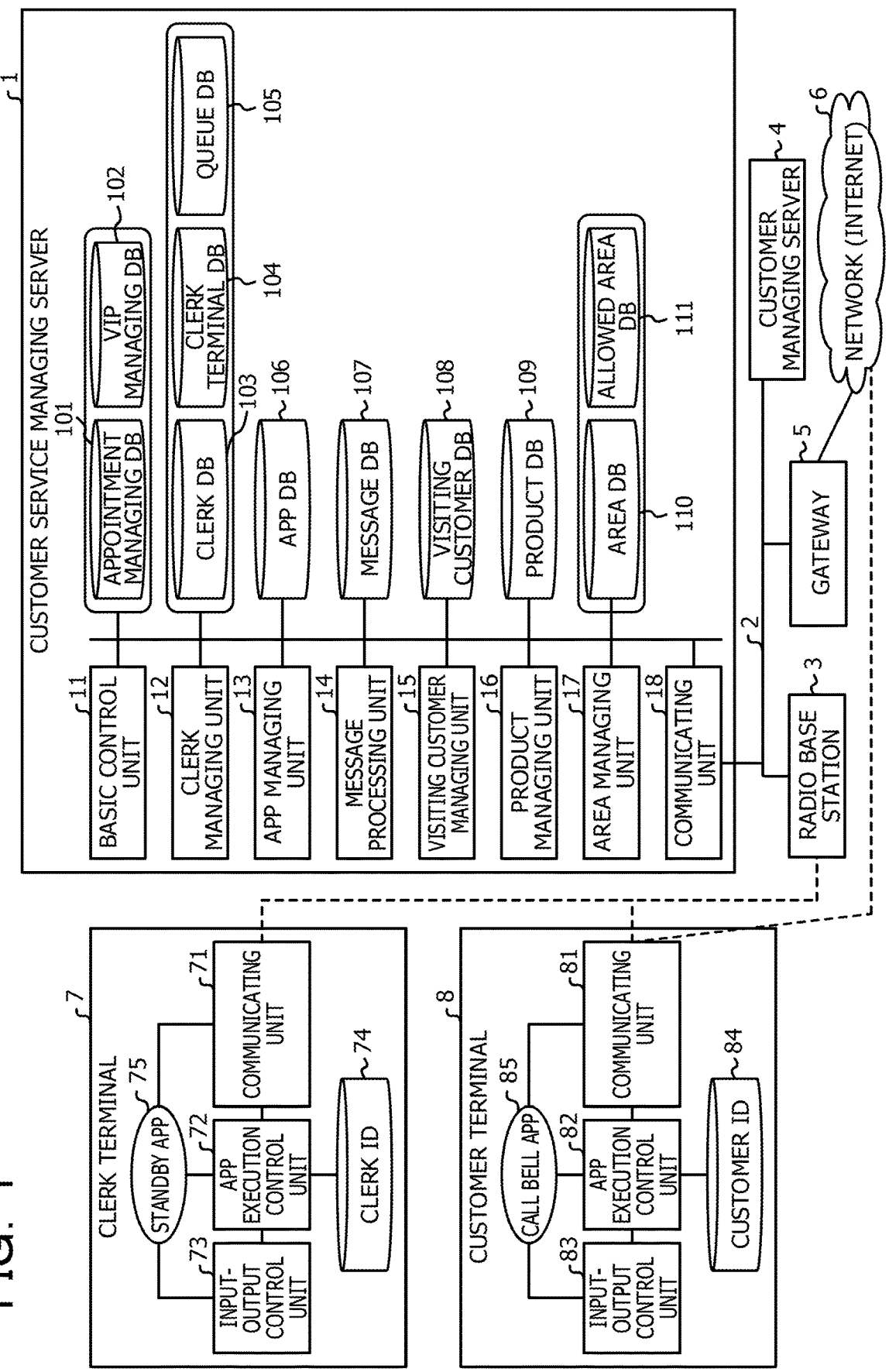
FIG. 1 is a diagram illustrating an example of configuration of a system according to one embodiment.

FIG. 1 is a diagram illustrating an example of configuration of a system according to one embodiment. As illustrated in FIG. 1, a customer service managing server 1 is communicatably coupled to a local network 2 within a store. The local network 2 is communicatably coupled with a radio base station 3, a customer managing server 4, and a gateway 5. The customer service managing server 1 is a device that manages customer service provided to customers within the store by clerks (persons in charge). The radio base station 3 is a device that transmits and receives radio signals via a wireless local area network (LAN) or the like within the store. There may be a plurality of radio base stations 3, depending on the area or shape of the store or the like. When a clerk terminal 7 carried by a clerk and a customer terminal 8 carried by a customer are each located within the store, the clerk terminal 7 and the customer terminal 8 are communicatably coupled to the customer service managing server 1 via the radio base station 3.

The gateway 5 is a device that communicatably couples the local network 2 and an external network 6 such as the Internet or the like to each other. The customer managing server 4 is a device that for example receives an appointment by a customer via the external network 6 and the gateway 5 and which reflects appointment information or the like in the customer service managing server 1.

The customer service managing server 1 includes a basic control unit 11, a clerk managing unit 12, an app managing unit 13, a message processing unit 14, a visiting customer managing unit 15, a product managing unit 16, an area managing unit 17, and a communicating unit 18. The customer service managing server 1 includes an appointment managing DB 101, a VIP managing DB 102, a clerk DB 103, a clerk terminal DB 104, a queue DB 105, an app DB 106, a message DB 107, a visiting customer DB 108, a product DB 109, an area DB 110, and an allowed area DB 111 as databases that are referred to or updated when processing is performed.

The basic control unit 11 has a function of distributing a dedicated application program (a standby app 75 or a call bell app 85 to be described later), or issuing a trigger for starting to perform customer service for a customer having an appointment or a VIP, when the clerk terminal 7 or the customer terminal 8 enters the area of the store. The basic control unit 11 uses the appointment managing DB 101 to manage customers having an appointment, and uses the VIP managing DB 102 to manage VIPs. FIG. 2 is a diagram illustrating an example of data structures of the appointment managing DB 101 and the VIP managing DB 102. The appointment managing DB 101 includes items such as an "appointment ID," an "appointed time," a "clerk ID," and a "customer ID." The "appointment ID" is information identifying an appointment. The "appointed time" is an appointed time (time period) desired for customer service. The "clerk ID" is information identifying a clerk in charge of the customer service. The "customer ID" is information identifying a customer. It is assumed that the appointment is made by a Web screen provided by the customer managing server 4, telephone, or the like. When the basic control unit 11 receives a request for an appointment from a customer, the basic control unit 11 determines whether or not the appointment can be made by referring to the appointment managing DB 101 (and also referring to the clerk DB 103 or the like as needed). Then, the basic control unit 11 registers an appointment content on the basis of a result of the determination. A "customer ID" identifying a customer treated as a VIP is set in the VIP managing DB 102.

Returning to FIG. 1, the clerk managing unit 12 has a function of managing static information and dynamic information of clerks. The clerk managing unit 12 uses the clerk DB 103, the clerk terminal DB 104, and the queue DB 105 to manage the clerks. FIG. 3 is a diagram illustrating an example of data structures of the clerk DB 103, the clerk terminal DB 104, and the queue DB 105. The clerk DB 103 includes items such as a "clerk ID," a "product in charge," a "manufacturer in charge," a "customer service in charge," and a "customer service time." The "clerk ID" is information identifying a clerk. The "product in charge" is information indicating a product category that the clerk is in charge of. The "manufacturer in charge" is information indicating a manufacturer that the clerk is in charge of. "*" in the example illustrated in FIG. 3 indicates that service can be provided irrespective of manufacturers. Fields in charge may be classified and defined in more detail, as for example in a case where a person in charge is well informed about a particular product among products of a same manufacturer.

The "customer service in charge" is information indicating a type of customer service (ordinary: an ordinary customer, appointment: a customer having an appointment, a VIP, or the like) that the clerk is in charge of. It is assumed in this case that persons dedicated solely to serving customers having appointments and VIP customers are provided. However, there is no limitation to this. It is assumed that a person in charge of VIPs is placed for each product category (television set (TV) or the like). A person in charge of VIPs may be placed for a plurality of products or all products. These persons in charge may be changed as appropriate according to a schedule or the like. For example, when an appointed time approaches, an available clerk may be secured for a customer having an appointment so that the available clerk is not allowed to respond to a call by an ordinary customer. The "customer service time" is an average time taken by the clerk to serve a customer (average customer service time per ordinary customer), the average time being obtained from an actual result of customer service in the past by the clerk. It is assumed that the customer service time is updated periodically, for example once in a day, or a week. The customer service time is used to estimate a waiting time when a customer service queue is formed for the clerk. The clerk managing unit 12 may manage the number of times of performing customer service within a given period. A method of usage, for example, is conceivable in which when there are a plurality of clerks who can respond to a call for customer service, a clerk having a small number of times of performing service is made to serve the customer.

The clerk terminal DB 104 includes items such as a "clerk ID," a "present position," a "terminal address," and a "state." The "clerk ID" is information identifying a clerk. The "present position" is information on the present position of the clerk terminal 7 carried by the clerk. The item of the "present position" stores coordinates within the store which coordinates are estimated on the basis of the position information notified periodically from the clerk terminal 7.

However, a result of converting the coordinates into position information easily understandable to humans, such as "oo department" or the like, may be managed. As a position estimating method, in a case where a positioning technology using a wireless LAN, for example, is utilized, a method is conceivable in which a map is generated in advance which map is based on relation between positions within the store and radio wave reception strengths, and a position is identified from an obtained radio wave reception strength on the basis of the map. Raw data (global positioning system (GPS) coordinate data, a radio wave reception strength in the wireless LAN, or the like) notified from the clerk terminal 7 may be registered as the position information. The "terminal address" is an address for communication of the clerk terminal 7 carried by the clerk. The "state" is information indicating the state of the clerk in relation to customer service (performing customer service, available, or the like).

The queue DB 105 includes items such as a "clerk ID" and a "queue." The "clerk ID" is information identifying a clerk. The "queue" is the reception ID of a call in a state of waiting for customer service by the clerk (there can be a plurality of reception IDs). In the example illustrated in FIG. 3, the call of a reception ID "3" is linked to the queue of a clerk ID "Staff-A," and there are no calls linked to the queues of clerk IDs "Staff-B" and "Staff-C." An average waiting time can be calculated by multiplying the length of the queue (the length of the queue of "Staff-A" is "1") by the customer service time of the corresponding clerk, the customer service time being stored in the clerk DB 103.

Returning to FIG. 1, the app managing unit 13 has a function of managing a standby app for a clerk and a call bell app for a customer by the app DB 106. FIG. 4 is a diagram illustrating an example of a data structure of the app DB 106. The app DB 106 includes items such as an "app ID," an "app name," and an "app main body." The "app ID" is information identifying an app. The "app name" is the name of the app. The "app main body" is the program main body of the app. The app is not limited to a binarized program, but may be a program in a text format, such as a hypertext markup language (HTML) app.

Returning to FIG. 1, the message processing unit 14 has a function of managing a call bell message (call) transmitted from the call bell app 85 of the customer terminal 8 by the message DB 107. FIG. 5 is a diagram illustrating an example of a data structure of the message DB 107. The message DB 107 includes items such as a "reception ID," a "customer ID," a "state," a "place," "clerk selection information," a "call time," a "customer service start time," and a "customer service end time." The "reception ID" is information identifying a received call bell message. The reception ID is assigned by the message processing unit 14 at a time of reception of the call bell message. The "customer ID" is information identifying a customer who transmitted the call bell message. It is assumed that an ID generated randomly when the call bell app is started is used as the customer ID in a case where the customer is not managed by a customer DB or the like. The customer ID can also be used to determine whether or not the call bell message is repeatedly sent from the customer whose call bell message has not yet been processed, and not to receive a plurality of call bell messages from the same customer.

The "state" is information indicating the processing state of the call bell message. The state includes "being processed," which indicates that the call bell message is being transmitted to the clerk, and "waiting," which indicates that the call bell message is set in a queue and is waiting for a turn. In addition, when the customer service is completed, information such as "completed" is set as the state. The "place" is information about the place (converted into a place within the store) of the customer when the call bell message is transmitted. The "clerk selection information" is information used to select (determine) the clerk to serve the customer. The clerk selection information is used to specify a product, specify a manufacturer, or specify a clerk when the customer transmits the call bell message. In addition, the place of the customer when the call bell message is transmitted is used as the clerk selection information when no positive specification is made. The "call time" is a time that the message processing unit 14 receives the call bell message. The "customer service start time" is a time at which customer service is determined to be started with the corresponding clerk coming into proximity with the customer as the transmission source of the call bell message (it is determined that the corresponding clerk has come into proximity with the customer when the clerk terminal 7 receives a beacon broadcast in a short range of the customer terminal 8, as will be described later). A time taken from reception of the instruction for the customer service to an actual start of the customer service can be grasped from a difference between the call time and the customer service start time. The "customer service end time" is a time at which the customer service is ended (it is determined that the customer service is ended on the basis of the positions of the customer and the clerk when the clerk terminal 7 becomes unable to receive the beacon broadcast from the customer terminal 8, as will be described later). In addition to these pieces of time information, a time at which the call bell message is transmitted to the clerk or a time at which the clerk checks the call bell message may be obtained and managed.

Returning to FIG. 1, the visiting customer managing unit 15 has a function of managing customers entering the store by using the visiting customer DB 108. FIG. 6 is a diagram illustrating an example of a data structure of the visiting customer DB 108. The visiting customer DB 108 includes items such as a "customer ID," a "type," a "present position," and a "terminal address." The "customer ID" is information identifying a customer. The "type" is information indicating a type such as an ordinary customer, a customer having an appointment or a VIP. The "present position" is information about the present place of the customer. The "terminal address" is an address for communication of the customer terminal 8 carried by the customer.

Returning to FIG. 1, the product managing unit 16 has a function of managing products handled by the store by using the product DB 109. FIG. 7 is a diagram illustrating an example of a data structure of the product DB 109. The product DB 109 includes items such as a "bar code," a "model number," a "manufacturer," and a "classification." The "bar code" is information about a bar code attached to a product shelf or the like. The "model number" is a number or a symbol identifying the product. The "manufacturer" is information about the manufacturer of the product. The "classification" is information indicating a category of the product such as TV.

Returning to FIG. 1, the area managing unit 17 has a function of managing each area within the store and managing areas in which a clerk who is performing customer service is allowed to move without the customer service being determined to be ended. The area managing unit 17 uses the area DB 110 and the allowed area DB 111 to manage the areas. FIG. 8 is a diagram illustrating an example of data structures of the area DB 110 and the allowed area DB 111. The area DB 110 includes items such as an "area ID," an "area name," and an "area definition." The "area ID" is information identifying an area. The "area name" is the name of the area. The "area definition" is a definition of the area by coordinates. The "area definition" is expressed by a circle (coordinates of a center and a radius) or a rectangle (coordinates of diagonal vertexes). When the positions of a clerk and a customer are included within the range of one of area definitions, it can be determined that the clerk and the customer are present in the area. The "area ID" of the area in which the clerk during customer service is allowed to move without the customer service being determined to be ended is set in the allowed area DB 111. That is, because it is determined that the customer service is started when the clerk who has received a request made by the customer for the customer service approaches the customer, it can be determined in principle that the customer service is ended when the clerk and the customer are separated from each other. However, the clerk may be separated from the customer to fetch a product from a warehouse or to perform payment processing at a cash register. In this case, it is not desirable to determine that the customer service is ended. Erroneously determining that the customer service is ended may resulting in the system not operating normally. A setting is therefore made so as not to determine that the customer service is ended when a movement of the clerk is a movement to an area set in the allowed area DB 111.

Returning to FIG. 1, the communicating unit 18 is communicatably coupled to the local network 2 to enable communication between each part within the customer service managing server 1 and an external device.

The clerk terminal 7 carried by the clerk includes a communicating unit 71, an app execution control unit 72, an input-output control unit 73, and the standby app 75. A clerk ID 74 is retained in a storage area. The communicating unit 71 communicates with the customer service managing server 1 via the radio base station 3, and performs the communication by a public wireless line. The communicating unit 71 also has a function of receiving a beacon by short-range radio or a non-audible sound wave which beacon is broadcast from the customer terminal 8. When the clerk terminal 7 enters the area of the store, the app execution control unit 72 receives the standby app 75 distributed from the customer service managing server 1, and sets the standby app 75 in an executed state. When the app execution control unit 72 receives the distributed standby app 75, the app execution control unit 72 identifies the clerk by the clerk ID 74. The input-output control unit 73 presents information to the user (clerk) of the clerk terminal 7, and receives an operation from the user.

The customer terminal 8 carried by the customer includes a communicating unit 81, an app execution control unit 82, an input-output control unit 83, and the call bell app 85. A customer ID 84 is retained in a storage area. The communicating unit 81 communicates with the customer service managing server 1 by a public wireless line via the radio base station 3. The communicating unit 81 also has a function of broadcasting a beacon by short-range radio or a non-audible sound wave to a vicinity of the communicating unit 81. When the customer terminal 8 enters the area of the store, the app execution control unit 82 receives the call bell app 85 distributed from the customer service managing server 1, and sets the call bell app 85 in an executed state. When the app execution control unit 82 receives the distributed call bell app 85, the app execution control unit 82 generates the customer ID 84 that uniquely identifies the customer, and thus identifies the customer. A preset customer ID 84 is used for a customer fixedly managed on the store side, such as a VIP. The input-output control unit 83 presents information to the user (customer) of the customer terminal 8, and receives an operation from the user.

Figure 9:
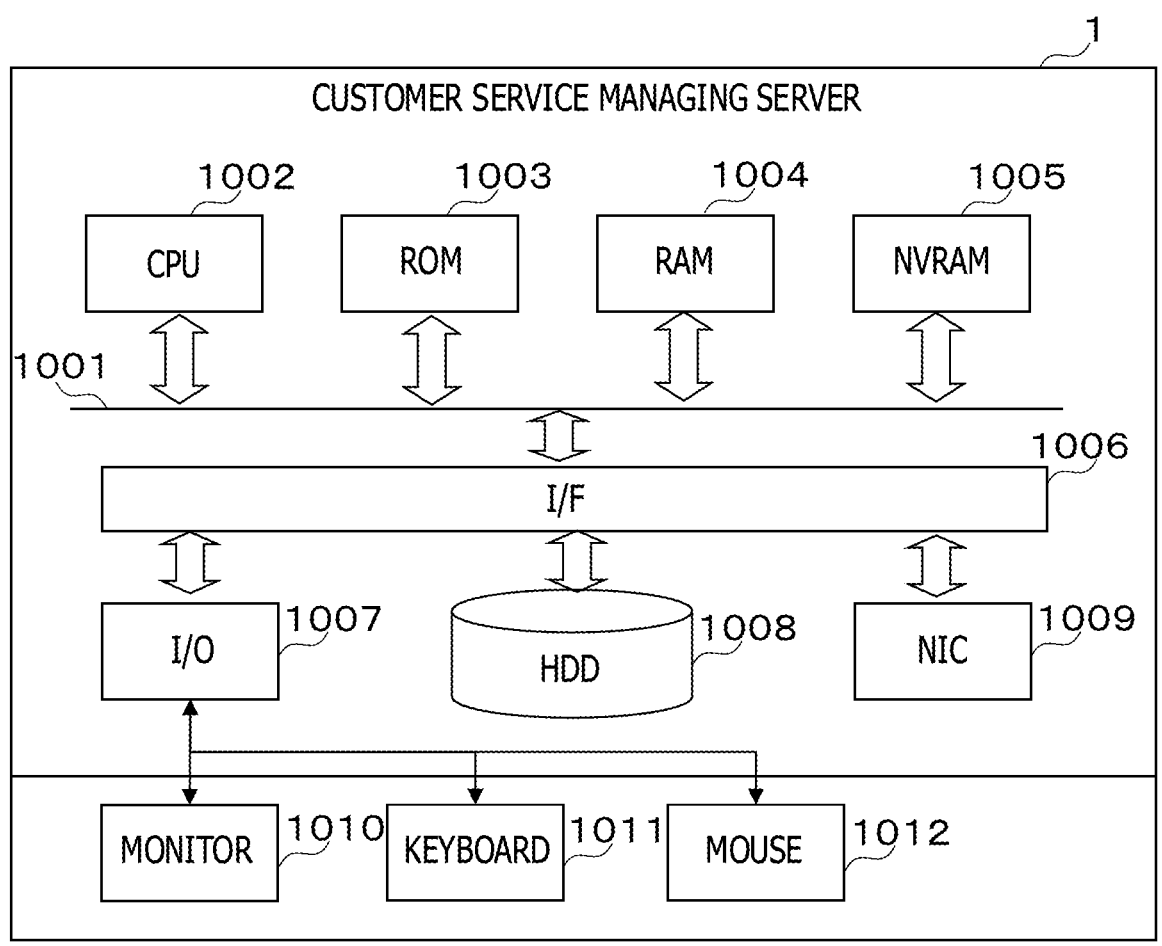
FIG. 9 is a diagram illustrating an example of hardware configuration of a customer service managing server.

FIG. 9 is a diagram illustrating an example of hardware configuration of a customer service managing server. The customer service managing server illustrated in FIG. 9 may be the customer service managing server 1 illustrated in FIG. 1. In FIG. 9, the customer service managing server 1 includes a central processing unit (CPU) 1002, a read only memory (ROM) 1003, a random access memory (RAM) 1004, and a non-volatile (NV) RAM 1005 coupled to a system bus 1001. The customer service managing server 1 includes an interface (I/F) 1006, includes an input/output (I/O) device 1007, a hard disk drive (HDD) 1008, and a network interface card (NIC) 1009 that are coupled to the I/F 1006, and includes a monitor 1010, a keyboard 1011, a mouse 1012, and the like that are coupled to the I/O 1007. The I/O 1007 can also be coupled with a compact disk/ digital versatile disk (CD/DVD) drive or the like. Each part of the customer service managing server 1 illustrated in FIG. 1 is implemented by execution of a program by the CPU 1002 illustrated in FIG. 9. The program may be provided by a recording medium, provided via a network, or may be provided in a state of being incorporated in a ROM.

Figure 10:
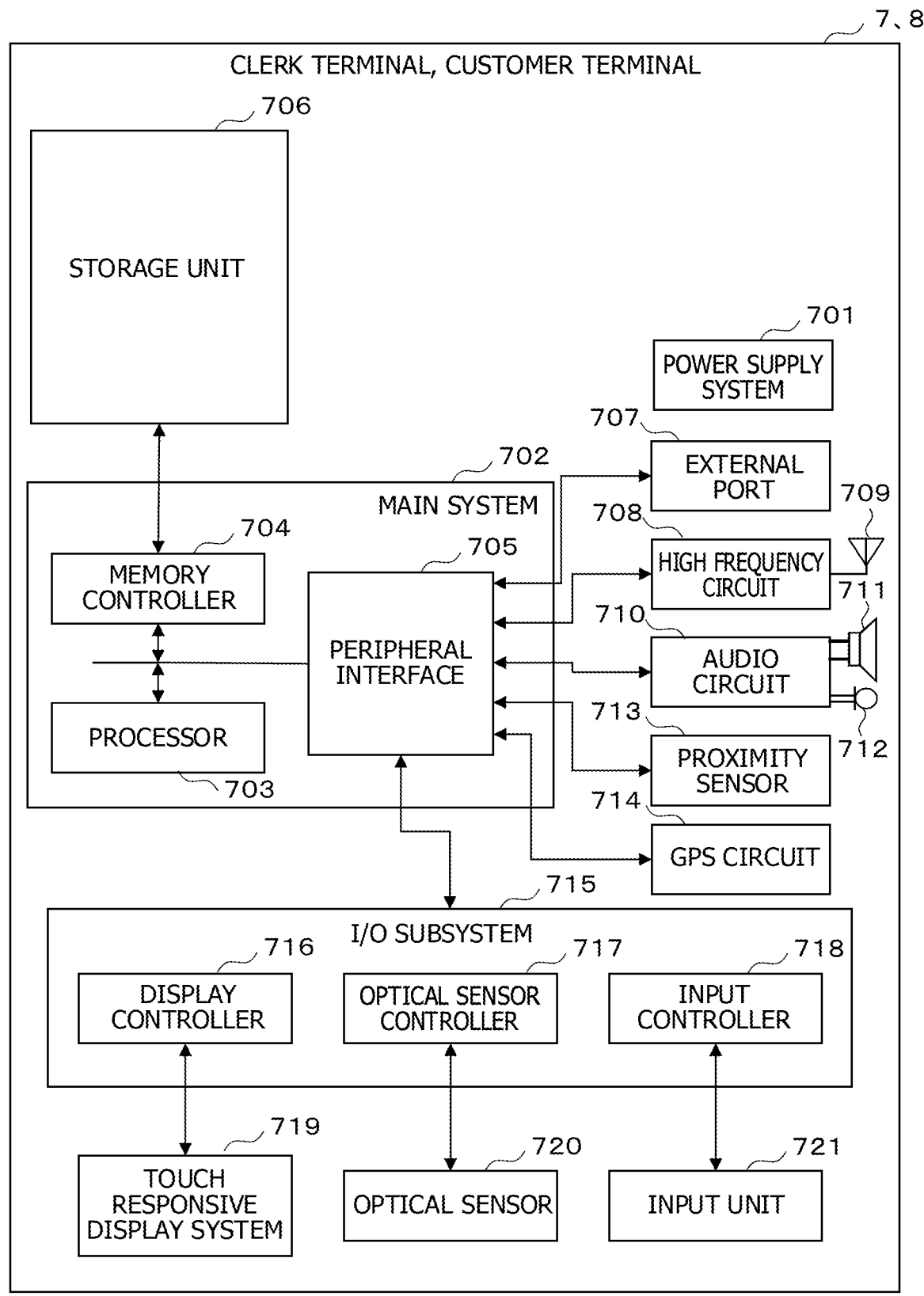
FIG. 10 is a diagram illustrating an example of hardware configuration of a clerk terminal and a customer terminal.

FIG. 10 is a diagram illustrating an example of hardware configuration of a clerk terminal and a customer terminal. The clerk terminal and the customer terminal illustrated in FIG. 10 may be the clerk terminal 7 and the customer terminal 8 illustrated in FIG. 1. In FIG. 10, the clerk terminal 7 or the customer terminal 8 includes a power supply system 701, a main system 702 including a processor 703, a memory controller 704, and a peripheral interface 705, and a storage unit 706. The clerk terminal 7 or the customer terminal 8 includes an external port 707, a high frequency circuit 708, an antenna 709, an audio circuit 710, a speaker 711, a microphone 712, a proximity sensor 713, and a GPS circuit 714. The clerk terminal 7 or the customer terminal 8 includes an I/O subsystem 715 including a display controller 716, an optical sensor controller 717, and an input controller 718, a touch responsive display system 719, an optical sensor 720, and an input unit 721. Each part of the clerk terminal 7 or the customer terminal 8 illustrated in FIG. 1 is implemented by execution of a program by the processor 703 illustrated in FIG. 10. The standby app 75 and the call bell app 85 are distributed from the customer service managing server 1. The other program may be provided by a recording medium, may be provided via a network, or may be provided in a state of being incorporated in a ROM.

Figure 11:
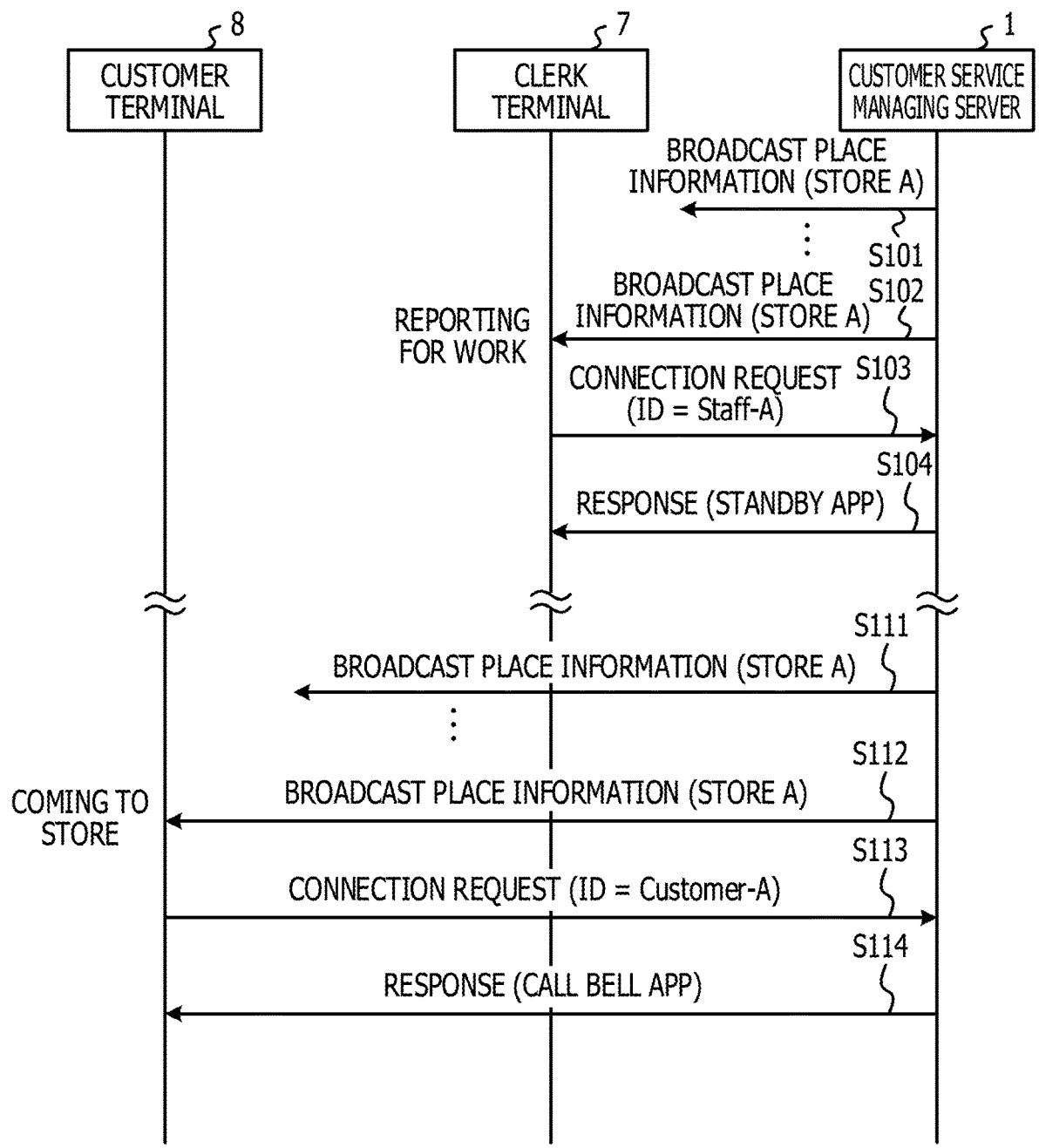
FIG. 11 is a sequence diagram illustrating an example of processing when a clerk reports for work and when a customer comes to a store.

FIG. 11 is a sequence diagram illustrating an example of processing when a clerk reports for work and when a customer comes to a store in the above-described embodiment. In FIG. 11, the basic control unit 11 of the customer service managing server 1 broadcasts, to an area within the store, place information (store A in this case) identifying the area by the radio base station 3 via the communicating unit 18 (S101). The broadcasting of the place information is continued while customer service managing service is provided in the store.

When the clerk reports for work carrying the clerk terminal 7 in this state, the communicating unit 71 of the clerk terminal 7 receives the broadcast place information (S102). Then, the communicating unit 71 makes a connection request having the clerk ID 74 (Staff-A in this case) from the communicating unit 71 to the customer service managing server 1 under control of the app execution control unit 72 (S103).

When the basic control unit 11 of the customer service managing server 1 confirms the clerk from the clerk ID 74 and a communication address included in the connection request, the basic control unit 11 distributes the standby app 75 for a clerk as a response to the clerk terminal 7 (S104). The app execution control unit 72 of the clerk terminal 7 receives the distributed standby app 75, and sets the received standby app 75 in an executed state.

The basic control unit 11 of the customer service managing server 1 similarly broadcasts, to the area within the store, the place information (store A in this case) identifying the area by the radio base station 3 via the communicating unit 18 (S111). The broadcasting of the place information is continued while customer service managing service is provided in the store.

When the customer comes to the store carrying the customer terminal 8 in this state, the communicating unit 81 of the customer terminal 8 receives the broadcast place information (S112), and makes a connection request having the customer ID 84 (Customer-A in this case) from the communicating unit 81 to the customer service managing server 1 under control of the app execution control unit 82 (S113).

When the basic control unit 11 of the customer service managing server 1 recognizes the customer from the customer ID 84 included in the connection request, the basic control unit 11 distributes the call bell app 85 for a customer as a response to the customer terminal 8 (S114). The app execution control unit 82 of the customer terminal 8 receives the distributed call bell app 85, and sets the received call bell app 85 in an executed state.

It is assumed that reporting for work or coming into the store is detected by the wireless LAN or the like. In addition, reporting for work or coming into the store may be detected by receiving another radio wave of Bluetooth (registered trademark) or the like, or reading a near field communication/radio frequency identification (NFC/RFID) tag installed in the store or the like.

Figure 12:
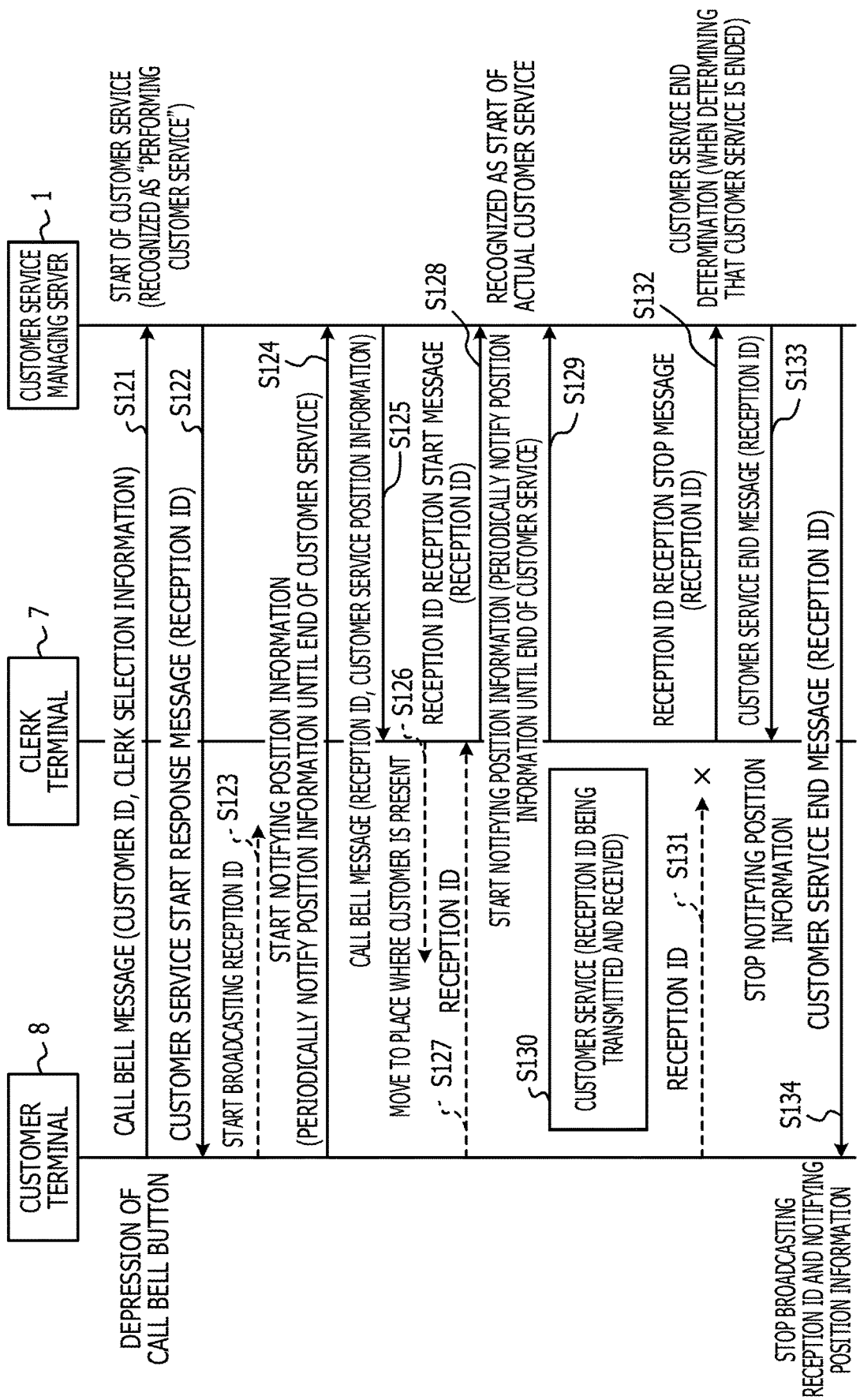
FIG. 12 is a sequence diagram illustrating an example of processing when a customer depresses a call bell button.

FIG. 12 is a sequence diagram illustrating an example of processing when a customer depresses a call bell button. FIG. 12 represents a case where a selected (determined) clerk is in an available state and thus processing is performed immediately without the call bell message being set in a queue.

In FIG. 12, when the customer present within the store desires customer service by a clerk, the customer inputs clerk selection information as needed, and depresses the call bell button, by the input-output control unit 83 in the call bell app 85 operating on the customer terminal 8. The call bell app 85 of the customer terminal 8 thereby transmits a call bell message having the customer ID and the clerk selection information to the customer service managing server 1 via the communicating unit 81 (S121).

When the message processing unit 14 of the customer service managing server 1 receives the call bell message via the communicating unit 18, the message processing unit 14 selects a clerk on the basis of the clerk selection information. When the clerk is in an available state, the message processing unit 14 transmits a customer service start response message having a reception ID to the customer terminal 8 via the communicating unit 18 (S122). Without limitation to the reception ID, information that can uniquely identify the particular customer, such as the customer ID, can be used. At this point in time, actual customer service is not started. However, the clerk may not be said to be in an available state. It is thus recognized that the customer service is being performed.

When the call bell app 85 of the customer terminal 8 receives the customer service start response message via the communicating unit 81, the call bell app 85 starts broadcasting a beacon having the reception ID by a short-range radio function of the communicating unit 81 or a non-audible sound wave from the speaker (S123).

The call bell app 85 of the customer terminal 8 starts notifying the position information of the own terminal to the customer service managing server 1 (S124). The notification of the position information is periodically performed until an end of the customer service.

The message processing unit 14 of the customer service managing server 1 transmits a call bell message having the reception ID and the customer service position information to the clerk terminal 7 via the communicating unit 18 (S125). According to the call bell message, the clerk moves to a place indicated by the customer service position information (S126). The customer service position information may be information about a position at a point in time that the customer presses the call bell button from the call bell app 85, or may be information about the present position of the customer. In the case of the information about the position at the point in time that the call bell button is pressed, it is desirable to make guiding display for the customer so as to make the customer stay and wait at the position. In this case, when the customer has moved from the position where the call bell button was pressed, an instruction is given to the customer to make the customer return to the position where the call was made. Alternatively, when the position of the moved customer is near the position of the clerk, an instruction is given to the customer to make the customer stay at the present position.

When the standby app 75 of the clerk terminal 7 reaches a position in proximity to the customer, the communicating unit 71 receives the beacon having the reception ID from the customer terminal 8 (S127). Thus, the standby app 75 of the clerk terminal 7 transmits a reception ID reception start message having the reception ID to the customer service managing server 1 via the communicating unit 71 (S128). The message processing unit 14 of the customer service managing server 1 recognizes a start of actual customer service by receiving the reception ID reception start message. The standby app 75 of the clerk terminal 7 starts notifying the position information of the own terminal to the customer service managing server 1 (S129). The notification of the position information is performed periodically until an end of the customer service.

The clerk thereafter serves the customer (S130). When the customer service is actually ended, and the customer and the clerk are separated from each other, it becomes difficult for the clerk terminal 7 to receive the beacon broadcast from the customer terminal 8 (S131). It is determined that it is difficult to receive the beacon when the beacon is not received at a certain level set in advance or higher. Thus, the standby app 75 of the clerk terminal 7 transmits a reception ID reception stop message having the reception ID to the customer service managing server 1 via the communicating unit 71 (S132).

When the message processing unit 14 of the customer service managing server 1 receives the reception ID reception stop message via the communicating unit 18, the message processing unit 14 determines whether the customer service is ended on the basis of the position information of the customer and the position information of the clerk. The position information used for the determination is desired to have a certain degree of accuracy. Therefore, the clerk terminal 7 and the customer terminal 8 can be requested to have same measurement timing for the position information notified from the clerk terminal 7 and the customer terminal 8. Alternatively, a request can be made from the side of the customer service managing server 1 to the clerk terminal 7 and the customer terminal 8 at short intervals to obtain the position information.

Here, factors in making the reception of the beacon difficult include:
- a temporary failure to receive the beacon;
- separation of the customer from the place of customer service (including simultaneous movement of the clerk to another place); and
- separation of only the clerk from the place of customer service.

In the case of a temporary failure to receive the beacon among these cases, it is not determined that the customer service is ended, but it is determined that the customer service is continued. In the case of separation of the customer from the place of customer service, it is determined that the customer service is ended when the customer is separated by a given distance. In the case of separation of only the clerk from the place of customer service, when a place to which the clerk moves is a place (area) to which the clerk may move during the customer service, such as a cash register or a warehouse, it is not determined that the customer service is ended, but it is determined that the customer service is continued.

Supposing in the following description that it is determined that the customer service is ended, the message processing unit 14 of the customer service managing server 1 transmits a customer service end message having the reception ID to the clerk terminal 7 (S133). Thus, the clerk terminal 7 stops notifying the position information. The message processing unit 14 of the customer service managing server 1 transmits a customer service end message having the reception ID to the customer terminal 8 (S134). Thus, the customer terminal 8 stops broadcasting the beacon and notifying the position information. Amounts of battery consumption by the terminals can be reduced by stopping unnecessary notification of the position information.

Figure 13:
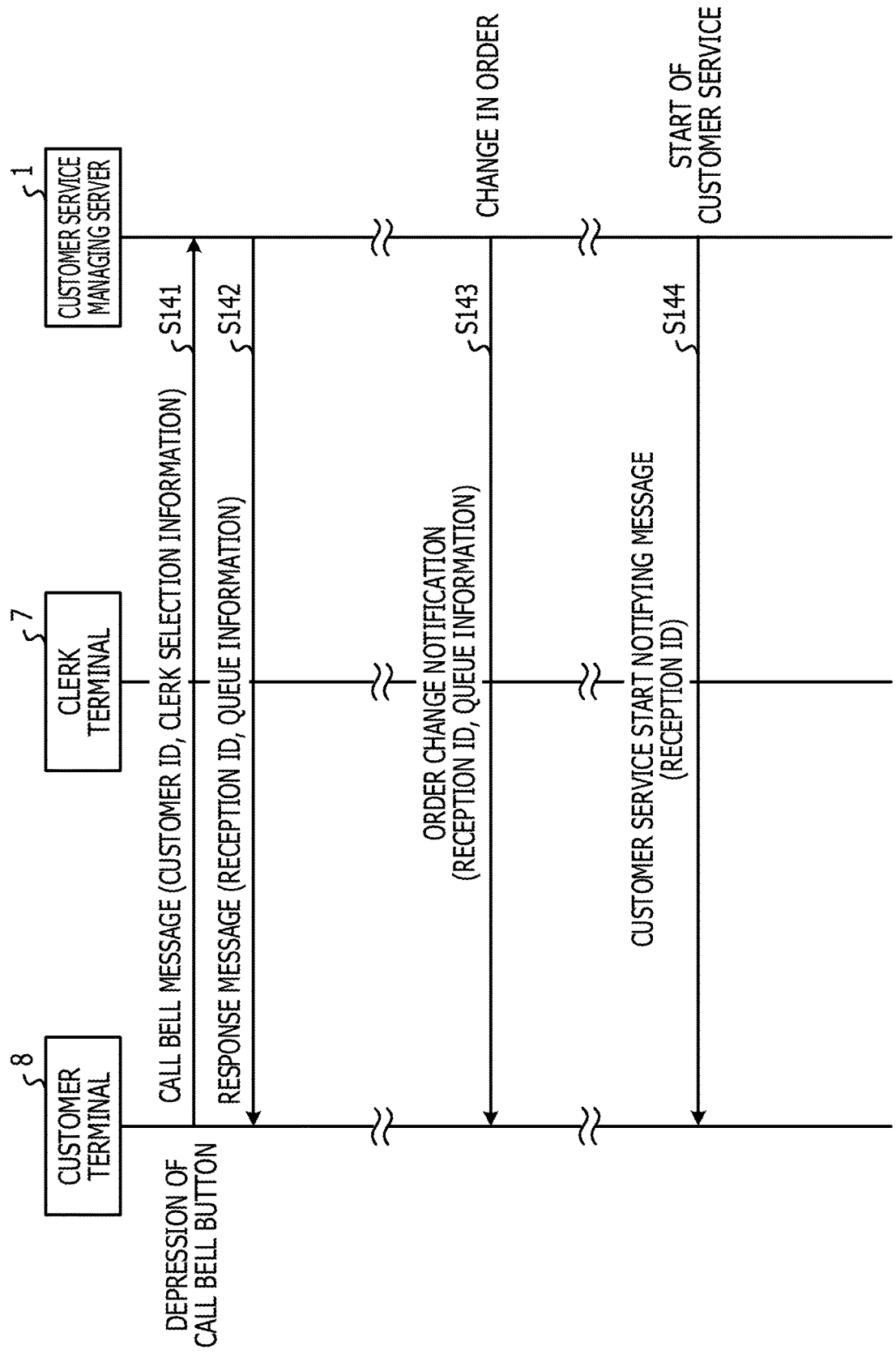
FIG. 13 is a sequence diagram illustrating an example of processing in a case where a call bell message is added to a queue because a clerk is performing customer service.

FIG. 13 represents a case where a selected (determined) clerk is performing customer service and thus a call bell message is set in a queue.

In FIG. 13, when a customer present within the store desires customer service by a clerk, the customer inputs clerk selection information as needed, and depresses the call bell button, by the input-output control unit 83 in the call bell app 85 operating on the customer terminal 8. Thus, the call bell app 85 of the customer terminal 8 transmits a call bell message having the customer ID and the clerk selection information to the customer service managing server 1 via the communicating unit 81 (S141).

When the message processing unit 14 of the customer service managing server 1 receives the call bell message via the communicating unit 18, the message processing unit 14 selects a clerk on the basis of the clerk selection information. When the clerk is performing customer service, the message processing unit 14 adds the call bell message to a queue, and transmits a response message having a reception ID and queue information (including an estimated waiting time) to the customer terminal 8 (S142). When the customer terminal 8 receives the response message, the customer terminal 8 displays the queue information for the clerk selected by the customer service managing server 1.

When a change thereafter occurs in order of the queue due to an end of serving another customer, the message processing unit 14 of the customer service managing server 1 transmits an order change notification having the reception ID and queue information to the customer terminal 8 (S143).

When the turn of the call bell message from the customer terminal 8 thereafter comes in the queue due to an end of serving another customer, the message processing unit 14 of the customer service managing server 1 begins processing for starting customer service. The message processing unit 14 transmits a customer service start notifying message (that is not a response to the call bell message, and is thus differentiated as a customer service start notifying message) having the reception ID to the customer terminal 8 via the communicating unit 18 (S144). Subsequent processing is similar to S123 to S134 in FIG. 12.

Description has been made of a case where when the queue information is presented in the processing of FIG. 13, the customer waits without performing anything. However, it may be made possible to deal with a case where the customer does not accept the waiting time. That is, when the customer does not accept the waiting time, the customer may be enabled to obtain the state of another clerk (including an estimated waiting time) from the customer service managing server 1, display the state of the other clerk, and change the clerk that is to serve the customer, by pressing a clerk change request button of the call bell app 85.

Figure 14:
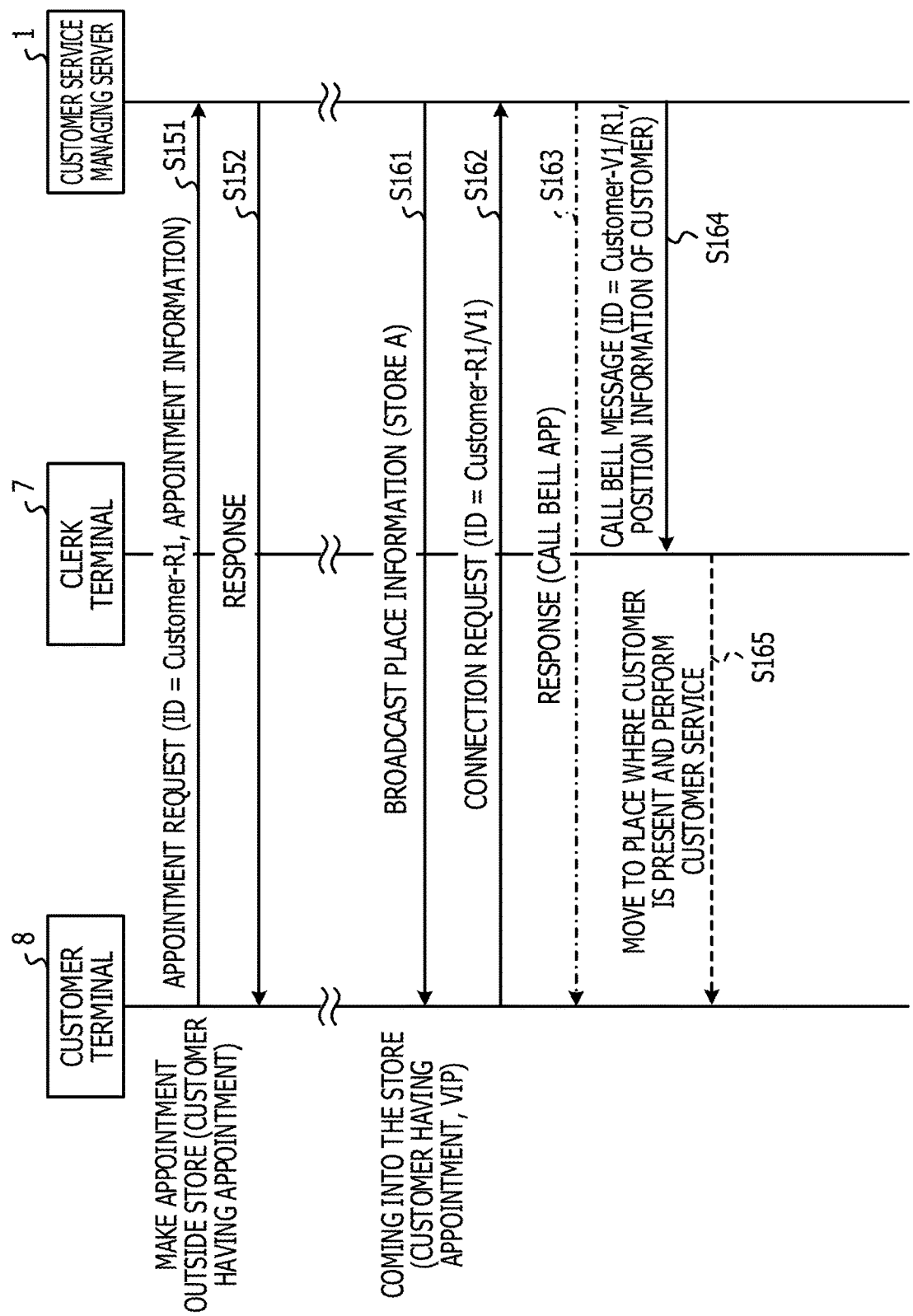
FIG. 14 is a sequence diagram illustrating an example of processing for a customer having an appointment or a VIP.

FIG. 14 is a sequence diagram illustrating an example of processing for a customer having an appointment or a VIP. In FIG. 14, a customer who desires an appointment for customer service makes an appointment request to the customer service managing server 1 via the customer managing server 4 from the customer terminal 8 outside the store (S151). The appointment request includes a customer ID and appointment information. When the appointment request is received, the customer service managing server 1 makes a response to the customer terminal 8 via the customer managing server 4 (S152).

When the customer having the appointment or a VIP thereafter comes to the store, the communicating unit 81 of the customer terminal 8 receives broadcast place information (S161). The communicating unit 81 then makes a connection request having the customer ID 84 from the communicating unit 81 to the customer service managing server 1 under control of the app execution control unit 82 (S162).

When the basic control unit 11 of the customer service managing server 1 recognizes the customer from the customer ID 84 included in the connection request, the basic control unit 11 distributes the call bell app 85 for a customer as a response to the customer terminal 8 (S163). The app execution control unit 82 of the customer terminal 8 receives the distributed call bell app 85, and sets the received call bell app 85 in an executed state. The call bell app 85 may not be distributed to customers having an appointment or VIPs.

Then, the message processing unit 14 of the customer service managing server 1 transmits a call bell message having the customer ID and the position information of the customer to the clerk terminal 7 of the clerk that is to perform customer service via the communicating unit 18 (S164). The position information of the customer can be obtained at the time of the connection request (S162), or can be obtained from the call bell app 85 (in the case where the call bell app 85 is distributed). In response to the call bell message, the clerk moves to a place where the customer is present, the place being indicated by the position information, and starts customer service (S165).

Figure 15:
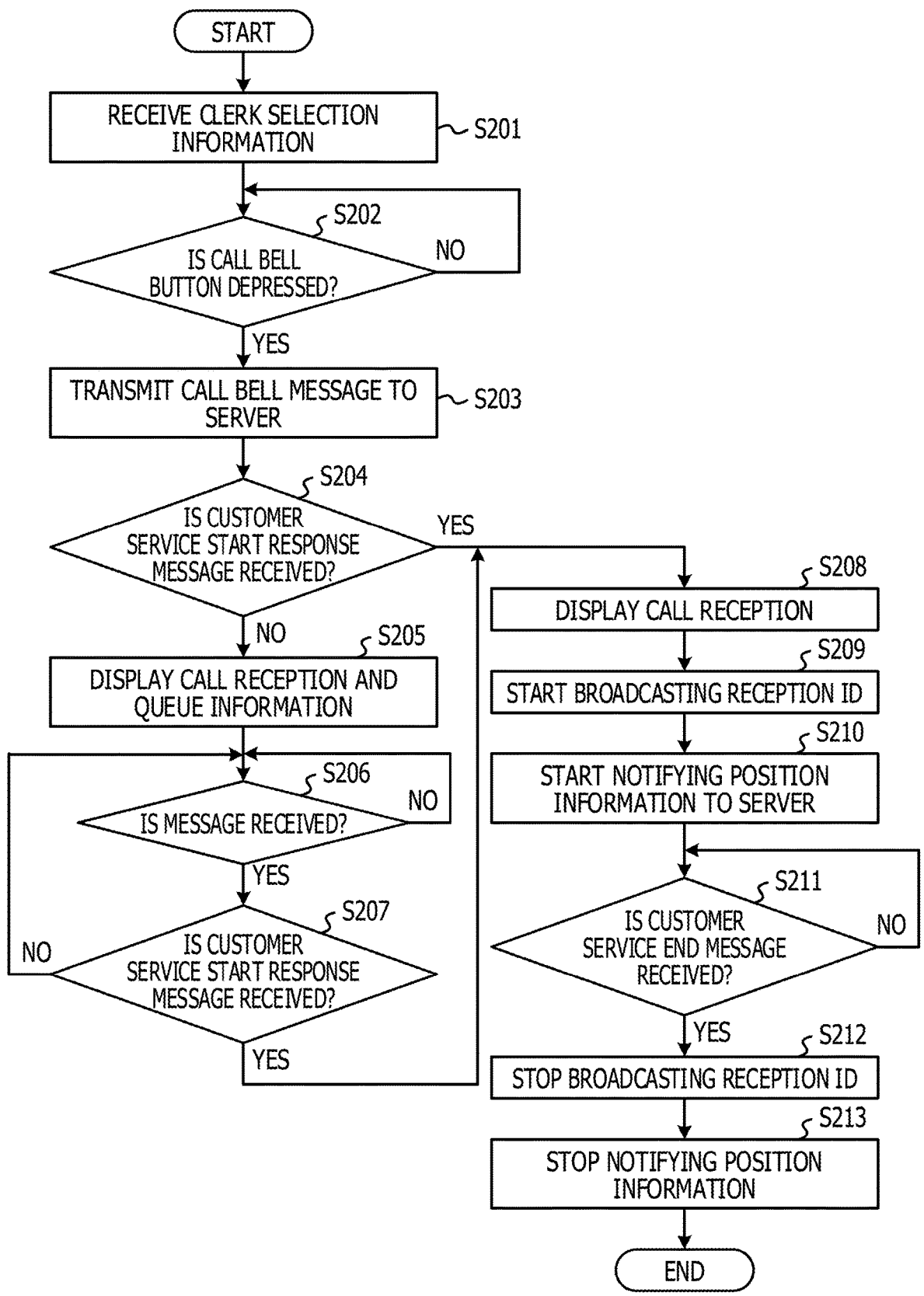
FIG. 15 is a flowchart illustrating an example of processing of a call bell app.

FIG. 15 is a flowchart illustrating an example of processing of a call bell app. The call bell app explained in FIG. 15 may be the call bell app 85 illustrated in FIG. 1. In FIG. 15, the call bell app 85 receives clerk selection information from the customer (S201), and waits for depression of the call bell button (S202). When the call bell button is depressed (Yes in S202), the call bell app 85 transmits a call bell message to the customer service managing server 1 (S203).

Figure 16A:
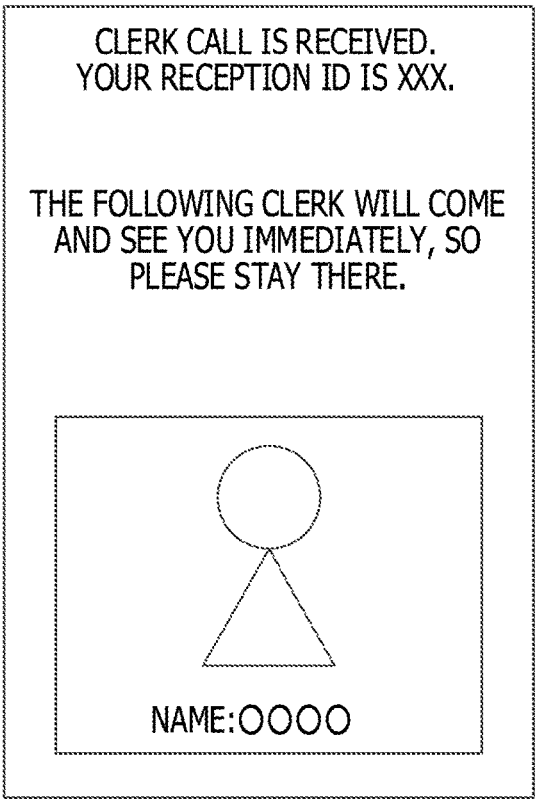
FIG. 16A and FIG. 16B are diagrams illustrating an example of screens of a call bell app.
Figure 16B:
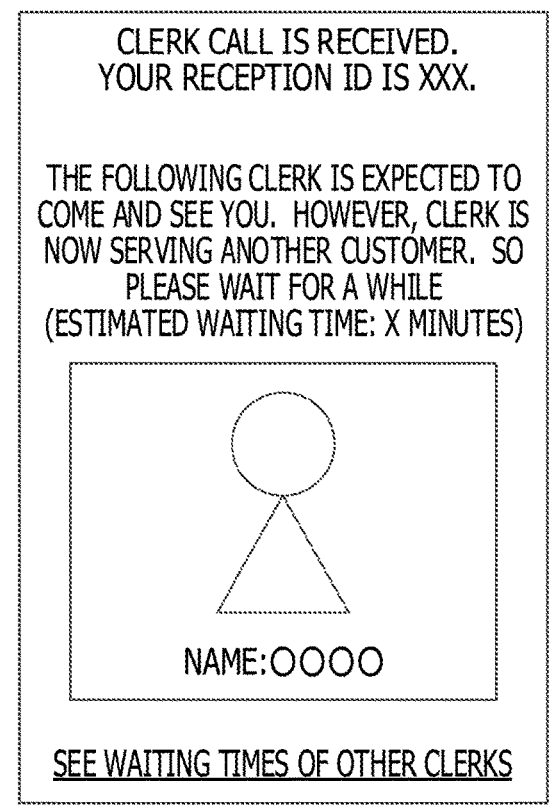

Next, the call bell app 85 determines whether or not a customer service start response message is received from the customer service managing server 1 (S204). When the customer service start response message is received (Yes in S204), the call bell app 85 displays reception of a call (S208). FIG. 16A and FIG. 16B are diagrams illustrating an example of screens of the call bell app 85. FIG. 16A illustrates an example of display of the reception of the call. Displayed contents include clerk information such as the name of a clerk and a photograph of the face of the clerk. The clerk information may also include an ID (information readable by a point of sales (POS) system, such as a bar code).

Returning to FIG. 15, the call bell app 85 starts broadcasting a reception ID (S209), and starts notifying position information to the customer service managing server 1 (S210). The call bell app 85 next waits until a customer service end message is received (S211). When a customer service end message is received (Yes in S211), the call bell app 85 stops broadcasting the reception ID (S212), and stops notifying the position information (S213). The call bell app 85 then ends the processing.

When the customer service start response message is not received (No in S204) after the transmission of the call bell message (S203), on the other hand, the call bell app 85 displays reception of a call and queue information (S205). FIG. 16B illustrates an example of display of the reception of the call and the queue information.

Returning to FIG. 15, the call bell app 85 waits until some message is received (S206). When a message is received (Yes in S206), the call bell app 85 determines whether or not a customer service start notifying message is received (S207). When a customer service start notifying message is not received (No in S207), the call bell app 85 returns to wait for a message (S206). When a customer service start notifying message is received (Yes in S207), the call bell app 85 proceeds to display the reception of the call (S208). The following processing is as described earlier.

Figure 17:
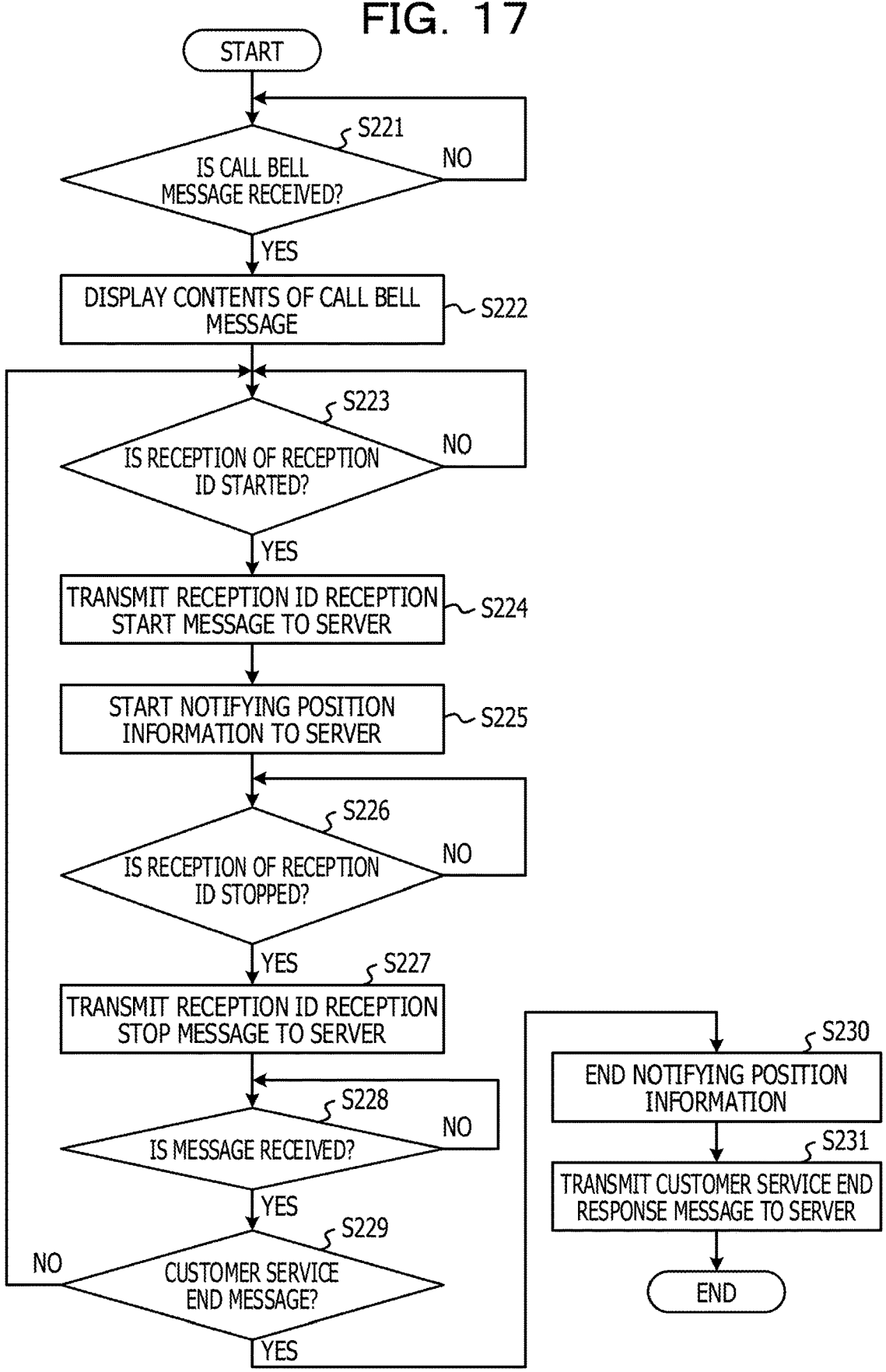
FIG. 17 is a flowchart illustrating an example of processing of a standby app.
Figure 18:
FIG. 18 is a diagram illustrating an example of a screen of a standby app.

FIG. 17 is a flowchart illustrating an example of processing of a standby app. The standby app explained in FIG. 17 may be the standby app 75 illustrated in FIG. 1. In FIG. 17, the standby app 75 waits until a call bell message is received (S221). When a call bell message is received (Yes in S221), the standby app 75 displays the contents of the call bell message (S222). FIG. 18 illustrates an example of a screen of the standby app 75, that is, an example of display of contents of a call bell message.

Returning to FIG. 17, the standby app 75 waits until a start of reception of a beacon including a reception ID from the customer terminal 8 (S223). When the reception is started (Yes in S223), the standby app 75 transmits a reception ID reception start message to the customer service managing server 1 (S224). The standby app 75 starts notifying position information to the customer service managing server 1 (S225).

Next, the standby app 75 waits until the reception of the beacon including the reception ID is stopped (S226). When the reception is stopped (Yes in S226), the standby app 75 transmits a reception ID reception stop message to the customer service managing server 1 (S227).

Next, the standby app 75 waits until some message is received (S228). When a message is received (Yes in S228), the standby app 75 determines whether or not the message is a customer service end message (S229). When the message is not a customer service end message (for example a customer service continuation message) (No in S229), the standby app 75 returns to wait for a start of reception of the beacon (S223). Subsequent processing corresponds to a case where the customer service is resumed after the clerk once goes away from the customer to check an inventory or the like. At this time, when the reception of the beacon including the reception ID is resumed, a "reception ID reception resumption message" is transmitted instead of "the reception ID reception start message." Because the position information has already been notified, a start of notification of the position information (S225) may be skipped.

When the message is a customer service end message (Yes in S229), the standby app 75 ends the notifying the position information (S230), and transmits a customer service end response message to the customer service managing server 1 (S231). The standby app 75 then ends the processing.

In the above-described processing, only the contents of the call bell message are simply displayed. However, by pressing a button of the standby app 75, the clerk may notify the customer service managing server 1 that the message is checked. In this case, when the customer service managing server 1 does not receive this notification for a certain time after transmitting the call bell message, the customer service managing server 1 may retransmit the call bell message to the clerk, or transmit the message to another clerk in an available state.

Figure 19:
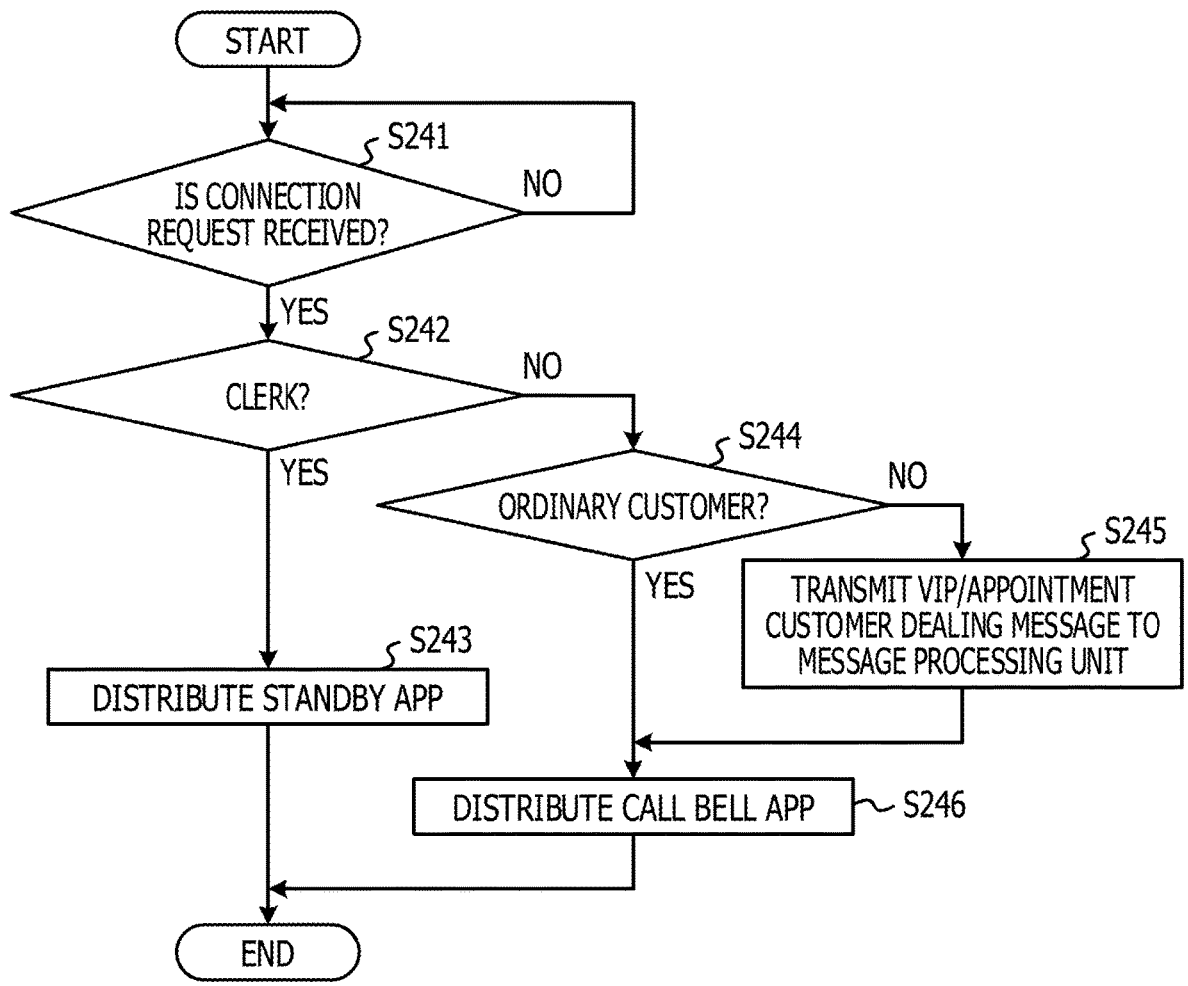
FIG. 19 is a flowchart illustrating an example of processing of a basic control unit.

FIG. 19 is a flowchart illustrating an example of processing of a basic control unit. The basic control unit explained in FIG. 19 may be the basic control unit 11 of the customer service managing server 1 illustrated in FIG. 1. In FIG. 19, the basic control unit 11 waits to receive a connection request (S241). When the basic control unit 11 receives the connection request (Yes in S241), the basic control unit 11 determines whether or not a terminal that has made the connection request is carried by a clerk on the basis of whether or not an ID included in the connection request is registered in the clerk DB 103 (S242). When the terminal that has made the connection request is carried by a clerk (Yes in S242), the basic control unit 11 distributes the standby app 75 to the terminal (clerk terminal 7) that has made the connection request (S243). The basic control unit 11 then ends the processing.

When the terminal that has made the connection request is not carried by a clerk (No in S242), on the other hand, the basic control unit 11 determines whether or not the terminal that has made the connection request is carried by an ordinary customer that is not a customer having an appointment or a VIP on the basis of whether or not the ID included in the connection request is registered in the appointment managing DB 101 or the VIP managing DB 102 (S244). When the terminal that has made the connection request is not carried by an ordinary customer (No in S244), the basic control unit 11 transmits a VIP/appointment customer dealing message to the message processing unit 14 (S245).

When the terminal that has made the connection request is carried by an ordinary customer (Yes in S244), and after the transmission of the VIP/appointment customer dealing message (S245), the basic control unit 11 distributes the call bell app 85 to the terminal (customer terminal 8) that has made the connection request (S246). The basic control unit 11 then ends the processing. The call bell app 85 may not be distributed to the terminal of other than an ordinary customer (VIP/customer having appointment).

Figure 20:
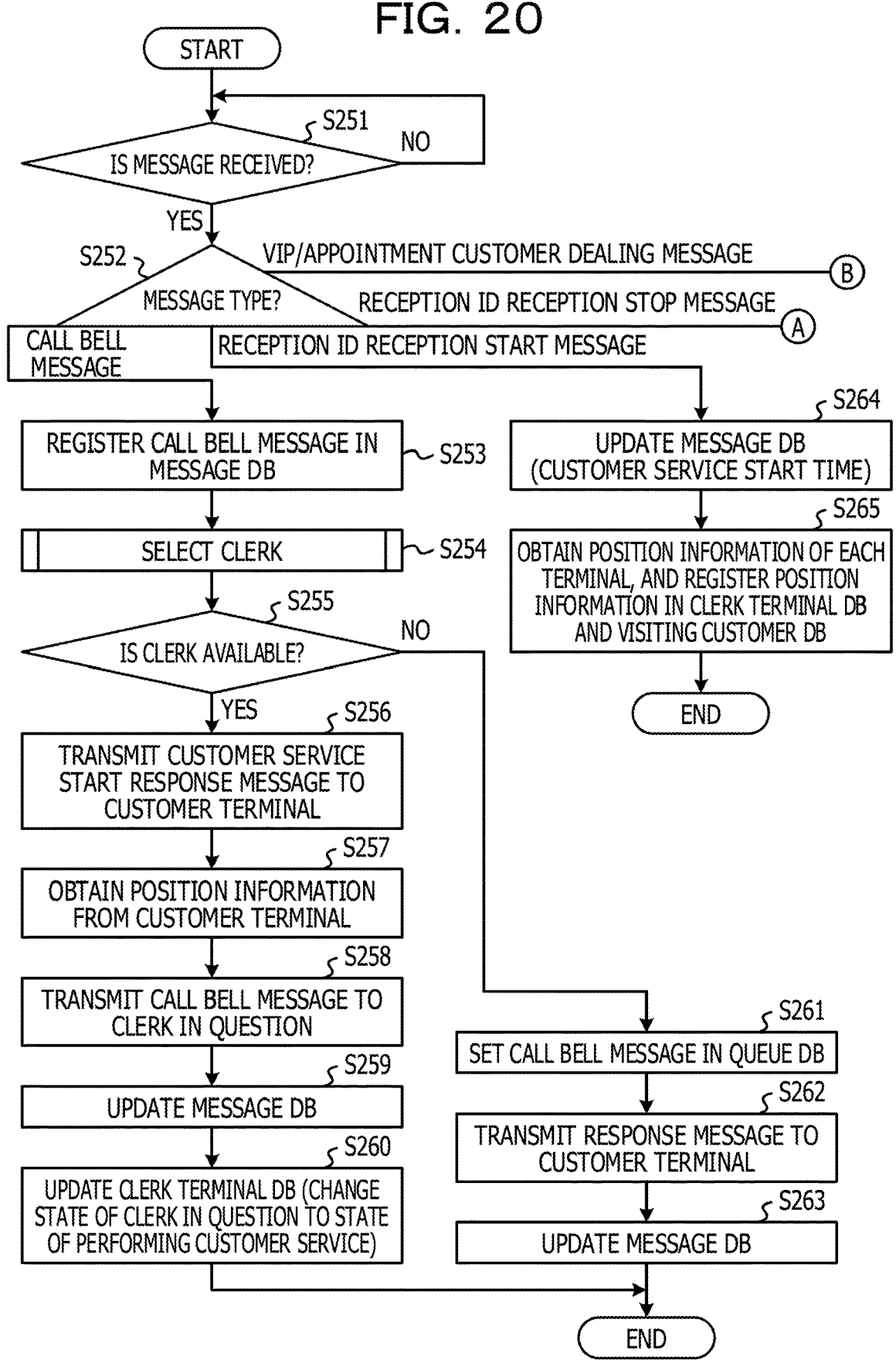
FIG. 20 is a flowchart illustrating an example of processing of a message processing unit.

FIG. 20 is a flowchart illustrating an example of processing of a message processing unit. The message processing unit explained in FIG. 20 may be the message processing unit 14 of the customer service managing server 1 illustrated in FIG. 1. In FIG. 20, the message processing unit 14 waits to receive a message (S251). When the message processing unit 14 receives a message (Yes in S251), the message processing unit 14 branches the processing according to the type of the message (S252).

When the received message is a call bell message, the message processing unit 14 registers the call bell message in the message DB 107 (S253).

Next, the message processing unit 14 selects a clerk on the basis of clerk selection information included in the call bell message or the position information of the customer which position information is regarded as the clerk selection information (S254).

Figure 21:
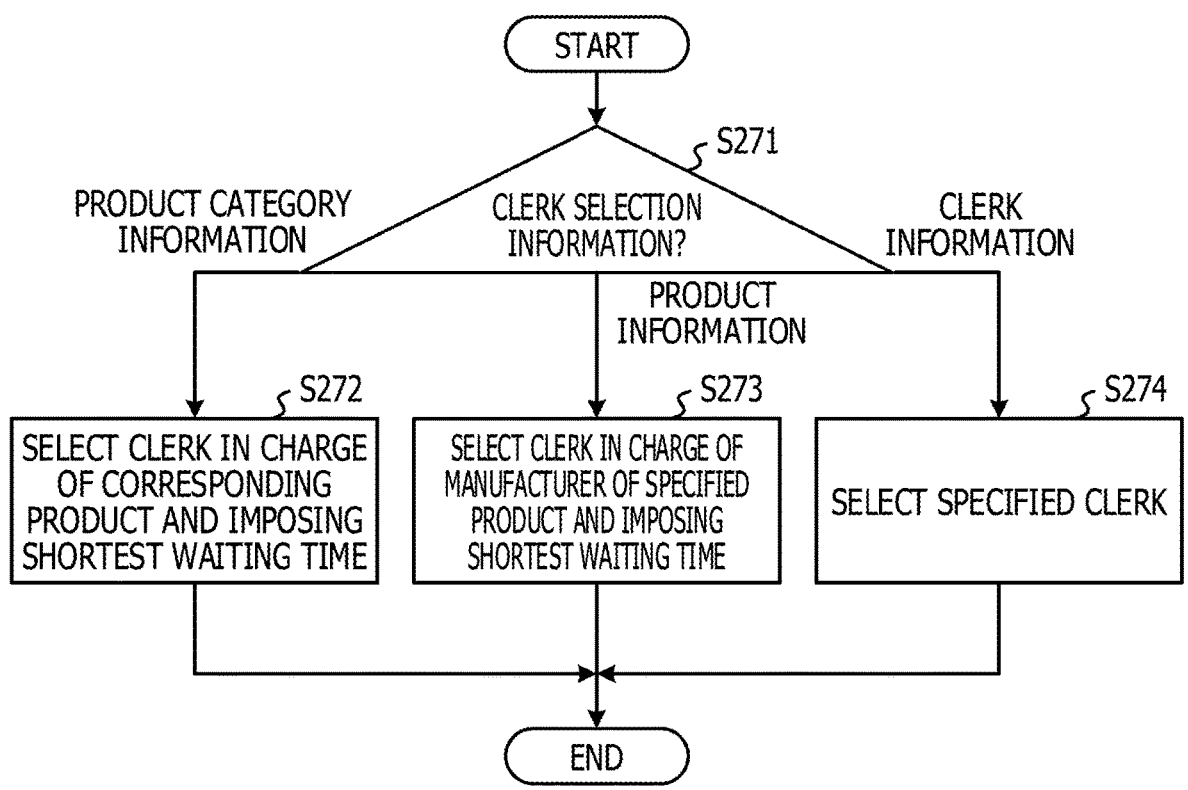
FIG. 21 is a flowchart illustrating an example of processing of selecting a clerk.

FIG. 21 is a flowchart illustrating an example of processing of selecting a clerk. In FIG. 21, the message processing unit 14 determines whether the clerk selection information is product category information, product information, or clerk information (S271). When the clerk selection information is product category information, the message processing unit 14 refers to the clerk DB 103 and the clerk terminal DB 104. Then, the message processing unit 14 selects a clerk that is in charge of products in a corresponding category and who imposes a shortest waiting time (S272). The message processing unit 14 then ends the processing.

When the clerk selection information is product information (information about one or more products) (an inquiry is often desired to be made about a specific product), the message processing unit 14 refers to the clerk DB 103 and the clerk terminal DB 104. Then, the message processing unit 14 selects a clerk that is in charge of a manufacturer of the specified product and who imposes a shortest waiting time (S273). The message processing unit 14 then ends the processing. The product information can be specified by a bar code of the product, an NFC/RFID tag of the product, the product itself, a photograph of a POP advertisement of the product, or the like.

When the clerk selection information is clerk information (when the customer desires to inquire of a particular clerk), the message processing unit 14 selects the specified clerk (S274). The message processing unit 14 then ends the processing. When the customer is made to select a clerk, the message processing unit 14 first extracts clerks in charge of a department identified from the position information of the customer. Then, the message processing unit 14 may notify information about the extracted clerks (including waiting times at the point in time) to the customer terminal 8 to allow a desired clerk to be selected.

When the clerk selection information is not positively specified (the customer often desires to inquire about general product information), the message processing unit 14 selects a clerk that is nearest to the position of the customer (position information of the clerk is obtained separately) and who imposes a shortest waiting time. GPS positioning information, a radio wave reception strength in the wireless LAN, or the like that is obtained at the department can be used as the clerk selection information related to the position information. A place can also be specified positively with a photograph of the product department or the like used as the clerk selection information.

Returning to FIG. 20, the message processing unit 14 determines whether or not the selected clerk is in an available state (S255). When the selected clerk is in an available state (Yes in S255), the message processing unit 14 transmits a customer service start response message to the customer terminal 8 (S256). Then, the message processing unit 14 obtains the position information notified from the customer terminal 8 (S257), and transmits a call bell message to the clerk terminal 7 (S258). The message processing unit 14 updates the message DB 107 (S259), and updates the clerk terminal DB 104 (changes the state of the clerk in question to a state of performing customer service) (S260). The message processing unit 14 then ends the processing.

When the selected clerk is not in an available state (No in S255), the message processing unit 14 sets the reception ID of the call bell message in the queue DB 105 (S261). Then, the message processing unit 14 transmits a response message to the customer terminal 8 (S262), and updates the message DB 107 (S263). The message processing unit 14 then ends the processing.

When the received message is a reception ID reception start message, on the other hand, the message processing unit 14 updates the message DB 107 (customer service start time) (S264). Then, the message processing unit 14 obtains the position information notified from each terminal, and registers the position information in the clerk terminal DB 104 and the visiting customer DB 108 (S265). The message processing unit 14 then ends the processing. In the case of the reception ID reception start message after the reception of the beacon is once stopped (reception ID reception resumption message), the message DB 107 does not need to be updated.

The following description will be made of a case where the received message is a reception ID reception stop message and a case where the received message is a VIP/appointment customer dealing message.

Figure 22:
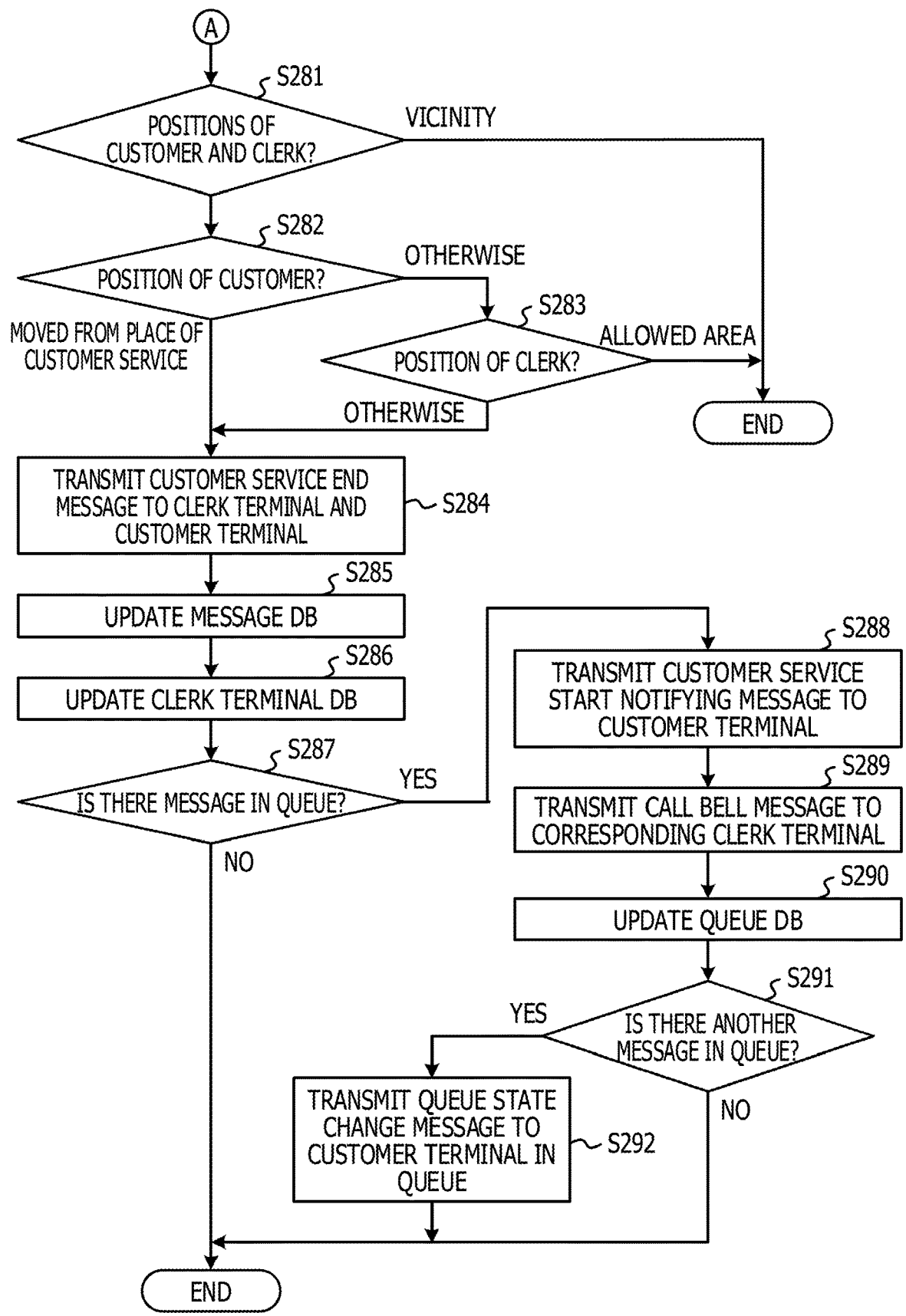
FIG. 22 is a flowchart illustrating an example of processing in a case where a reception identification (ID) reception stop message is received.

FIG. 22 is a flowchart illustrating an example of processing in a case where a reception ID reception stop message is received. In FIG. 22, the message processing unit 14 determines whether or not the customer and the clerk are located in the vicinity of each other (S281). When the customer and the clerk are located in the vicinity of each other, the message processing unit 14 then ends the processing. In this case, a temporary failure to receive the beacon is determined to have occurred, and it is thus recognized that the clerk is performing customer service. When the customer and the clerk are not located in the vicinity of each other, the message processing unit 14 determines whether the customer has moved from the place of customer service by more than a given distance (including a case where in addition to the customer, the clerk has also moved to a place different from a place of the customer) or otherwise (S282). In the otherwise case, the message processing unit 14 determines whether the position of the clerk is in an area in which movement during the customer service is allowed, the area being set in the allowed area DB 111 or otherwise (S283).

Whether or not the position of the clerk is in an allowed area is determined as follows, for example. Whether or not the clerk is in an allowed area is determined after the passage of a given time t considered to be taken by the clerk to move to the allowed area from the place of customer service after the clerk terminal 7 does not receive the beacon from the customer terminal 8 (given time t is dynamically set according to a distance of movement and a walking speed). When the clerk is in an allowed area, it is recognized that the clerk is performing customer service. The message processing unit 14 then ends the processing.

When the customer has moved from the place of customer service (excluding the case where the customer and the clerk are in the vicinity of each other), or when the position of the clerk is in other than an allowed area, the message processing unit 14 transmits a customer service end message to the clerk terminal 7 and the customer terminal 8 (S284). Then, the message processing unit 14 updates the message DB 107 (S285), and updates the clerk terminal DB 104 (S286).

Next, the message processing unit 14 determines whether or not there is a message in the queue of the clerk that has ended the customer service in the queue DB 105 (S287). When there is no message in the queue (No in S287), the message processing unit 14 ends the processing.

When there is a message in the queue (Yes in S287), on the other hand, the message processing unit 14 transmits a customer service start notifying message to the customer terminal 8 corresponding to the message at the head of the queue (S288). Then, the message processing unit 14 transmits a call bell message to the clerk terminal 7 (S289), and updates the queue DB 105 (S290).

Next, the message processing unit 14 determines whether or not there is another message in the queue of the clerk (S291). When there is no other message (No in S291), the message processing unit 14 ends the processing. When there is another message (Yes in S291), on the other hand, the message processing unit 14 transmits a queue state change message to the customer terminal 8 in the queue (S292). The message processing unit 14 then ends the processing.

Description has been made also of a case where the transmission of a customer service end message causes processing to be performed for a customer in a waiting state. Similar processing may be performed for a customer in a waiting state when it is detected that a clerk becomes available for customer service for a reason other than an end of customer service.

Figure 23:
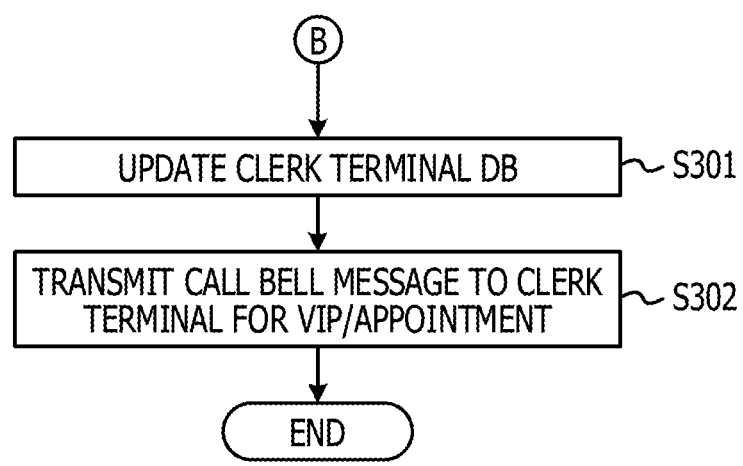
FIG. 23 is a flowchart illustrating an example of processing in a case where a VIP/appointment customer dealing message is received.

FIG. 23 is a flowchart illustrating an example of processing in a case where a VIP/appointment customer dealing message is received. In FIG. 23, the message processing unit 14 updates the clerk terminal DB 104 (S301). Then, the message processing unit 14 transmits a call bell message to the clerk terminal 7 for a VIP/appointment (S302). The message processing unit 14 then ends the processing.

As described above, according to the present embodiment, the state of customer service can be managed appropriately.

The above description has been made on the basis of preferred embodiment. The description has been made herein by illustrating specific concrete examples. It is apparent, however, that various modifications and changes can be made to these concrete examples without departing from a wide spirit and scope defined in claims. That is, details of the concrete examples and the accompanying drawings are not to be construed as restrictive.

The processing order in each sequence diagram and each flowchart described above can be changed arbitrarily unless a logical inconsistency occurs.

Place information is an example of "area information." The clerk terminal 7 is an example of a "first terminal device." The standby app 75 is an example of a "first application program." The customer terminal 8 is an example of a "second terminal device." The call bell app 85 is an example of a "second application program." A call bell message is an example of a "customer service request." A reception ID is an example of "identifying information." A reception ID reception start message is an example of "reception start information." A reception ID reception stop message is an example of "reception stop information." An allowed area is an example of a "preset area."

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A customer service managing method executed by a processor included in an information processing device that manages a first terminal device and a second terminal device, the customer service managing method comprising:

identifying a clerk to perform customer service from among a plurality of clerks based on a customer service request and clerk terminal information indicating a state of each of the plurality of clerks, the state being related to customer service, when receiving the customer service request from the second terminal device;

transmitting a call bell message for instructing the customer service to the first terminal device held by the identified clerk;

updating the clerk terminal information so as to indicate that the identified clerk is performing customer service when receiving, from the first terminal device that has received the call bell message, reception start information indicating that the first terminal device has received a beacon including the identifying information broadcast from the second terminal device;

receiving, from the first terminal device, reception stop information indicating that the first terminal device becomes unable to receive the beacon broadcast from the second terminal device;

determining, in response to the received reception stop information, whether the first terminal device is separated from the second terminal device by a given distance based on position information of the first terminal device and the second terminal device;

when it is determined that the first terminal device is separated from the second terminal device by the given distance, updating the clerk terminal information so as to indicate that the customer service by the identified clerk is ended and identified clerk is in an available state; and transmitting, to the second terminal device, a customer service end message that causes the second terminal device to stop broadcasting the beacon.

2. The customer service managing method according to claim 1, further comprising:

transmitting area information identifying the area to a given area; and transmitting a first application program corresponding to the terminal identifying information to the first terminal device, when receiving terminal identifying information identifying the first terminal device from the first terminal device that received the area information, and wherein the updating includes receiving reception start information or the reception stop information generated by the first terminal device according to execution of the first application program.

3. The customer service managing method according to claim 2, further comprising:

transmitting a second application program corresponding to the terminal identifying information to the second terminal device, when receiving terminal identifying information identifying the second terminal device from the second terminal device receiving the area information, wherein the identifying includes receiving the customer service request input to the second terminal device according to execution of the second application program.

4. The customer service managing method according to claim 1, wherein the transmitting of the identifying information includes setting the identifying information in a queue corresponding to the identified clerk when the identified clerk is performing customer service and transmitting the identifying information to the first terminal device and the second terminal device when a turn of the identifying information comes in the queue.

5. The customer service managing method according to claim 1, further comprising:

receiving first position information of the first terminal device from the first terminal device in given cycles after receiving the reception start information from the first terminal device; and transmitting an end message to stop transmission of the first position information to the first terminal device when receiving the reception stop information from the first terminal device.

6. The customer service managing method according to claim 5, further comprising:

receiving second position information of the second terminal device from the second terminal device in given cycles after transmitting the identifying information to the second terminal device, wherein the updating the clerk terminal information so as to indicate that the state of the identified clerk is the available state includes:

determining whether a customer having the second terminal device has moved from a place of the customer service by more than a given distance;

when it is determined that the customer has moved from the place by more than the given distance, updating the clerk terminal information so as to indicate that the identified clerk is in the available state;

when it is determined that the customer has not moved from the place by more than the given distance, determining whether a position of the clerk is in an area in which movement during the customer service is allowed; and when it is determined that the position of the clerk is not in the area, updating the clerk terminal information so as to indicate that the identified clerk is in the available state.

7. The customer service managing method according to claim 1, wherein the information included in the customer service request is information about the clerk specified by a customer from among the plurality of clerks.

8. The customer service managing method according to claim 1, wherein the beacon is a beacon transmitted from the second terminal device using radio or a non-audible sound wave.

9. The customer service managing method according to claim 1, wherein the transmitting the identifying information includes transmitting also customer service position information representing information about a place in which to perform customer service to the first terminal device.

10. The customer service managing method according to claim 9, wherein the customer service position information is information about a present position of a customer.

11. The customer service managing method according to claim 1, further comprising:

transmitting customer service start information for notifying start of the customer service to the second terminal device, the customer service start information including identification information identifying the customer service request;

periodically receiving the position information notified by the second terminal device that has received the customer service start information; and periodically receiving the position information notified by the first terminal device that has received the reception start information.

12. The customer service managing method according to claim 1, further comprising:

transmitting, to the first terminal device, the customer service end message that causes the first terminal device to stop notifying the position information of the first terminal device.

13. An information processing device that manages a first terminal device and a second terminal device, the information processing device comprising:

a memory; and a processor coupled to the memory and configured to:

identify a clerk that is to perform customer service from among a plurality of clerks based on a customer service request and clerk terminal information indicating a state of each of the plurality of clerks, the state being related to customer service, when receiving the customer service request from the second terminal device;

transmit a call bell message for instructing the customer service to the first terminal device held by the identified clerk;

update the clerk terminal information so as to indicate that the identified clerk is performing customer service when receiving, from the first terminal device that has received the call bell message, reception start information indicating that the first terminal device has received a beacon including the identifying information broadcast from the second terminal device;

receive, from the first terminal device, reception stop information indicating that the first terminal device becomes unable to receive the beacon broadcast from the second terminal device;

determine, in response to the received reception stop information, whether the first terminal device is separated from the second terminal device by a given distance based on position information of the first terminal device and the second terminal device;

when it is determined that the first terminal device is separated from the second terminal device by the given distance, update the clerk terminal information so as to indicate that the customer service by the identified clerk is ended and the identified clerk is in an available state; and transmit, to the second terminal device, a customer service end message that causes the second terminal device to stop broadcasting the beacon.

14. A non-transitory computer-readable storage medium storing a program that causes a computer to execute a process, the computer managing a first terminal device and a second terminal device, the process comprising:
- identifying a clerk to perform customer service from among a plurality of clerks based on a customer service request and clerk terminal information indicating a state of each of the plurality of clerks, the state being related to customer service, when receiving the customer service request from the second terminal device;
- transmitting a call bell message for instructing the customer service to the first terminal device held by the identified clerk;
- updating the clerk terminal information so as to indicate that the identified clerk is performing customer service when receiving, from the first terminal device that has received the call bell message, reception start information indicating that the first terminal device has received a beacon including the identifying information broadcast from the second terminal device;
- receiving, from the first terminal device, reception stop information indicating that the first terminal device becomes unable to receive the beacon broadcast from the second terminal device;
- determining, in response to the received reception stop information, whether the first terminal device is separated from the second terminal device by a given distance based on position information of the first terminal device and the second terminal device;
- when it is determined that the first terminal device is separated from the second terminal device by the given distance, updating the clerk terminal information so as to indicate that the customer service by the identified clerk is ended and identified clerk is in an available state; and
- transmitting, to the second terminal device, a customer service end message that causes the second terminal device to stop broadcasting the beacon.

* * * * *